(12) United States Patent
Hyakutake et al.

(10) Patent No.: US 7,142,690 B2
(45) Date of Patent: Nov. 28, 2006

(54) SYSTEM, COMPUTER PROGRAM PRODUCT AND METHOD FOR MANAGING DOCUMENTS

(75) Inventors: Shogo Hyakutake, Boonton Township, NJ (US); Hiroaki Ishizuka, San Jose, CA (US); Minoru Aoshima, Edgewater, NJ (US); Akio Kizawa, Ridgewood, NJ (US); Hiroshi Kitada, Tuckahoe, NY (US)

(73) Assignees: Ricoh Company, Ltd., Tokyo (JP); Ricoh Corporation, West Caldwell, NJ (US)

( * ) Notice: Subject to any disclaimer, the term of this patent is extended or adjusted under 35 U.S.C. 154(b) by 764 days.

(21) Appl. No.: 09/785,433

(22) Filed: Feb. 20, 2001

(65) Prior Publication Data

US 2002/0114013 A1 Aug. 22, 2002

(51) Int. Cl.
*G06K 9/00* (2006.01)
(52) U.S. Cl. .................. 382/100; 358/3.28; 713/176
(58) Field of Classification Search ................ 382/100; 358/3.28; 713/176
See application file for complete search history.

(56) References Cited

U.S. PATENT DOCUMENTS

| | | | |
|---|---|---|---|
| 5,606,609 A * | 2/1997 | Houser et al. | 713/179 |
| 5,673,316 A * | 9/1997 | Auerbach et al. | 705/51 |
| 5,995,678 A | 11/1999 | Motoyama | |
| 6,002,772 A * | 12/1999 | Saito | 705/58 |
| 6,009,442 A | 12/1999 | Chen et al. | |
| 6,141,753 A * | 10/2000 | Zhao et al. | 713/176 |
| 6,148,333 A * | 11/2000 | Guedalia et al. | 709/219 |
| 6,233,684 B1 * | 5/2001 | Stefik et al. | 713/176 |
| 6,262,732 B1 | 7/2001 | Coleman et al. | |
| 6,351,815 B1 * | 2/2002 | Adams | 713/200 |
| 6,389,151 B1 * | 5/2002 | Carr et al. | 382/100 |
| 6,442,611 B1 * | 8/2002 | Navarre et al. | 709/227 |
| 6,480,304 B1 | 11/2002 | Os et al. | |
| 6,487,301 B1 * | 11/2002 | Zhao | 382/100 |
| 6,496,206 B1 | 12/2002 | Mernyk et al. | |
| 6,912,294 B1 * | 6/2005 | Wang et al. | 382/100 |
| 2002/0049614 A1 * | 4/2002 | Rice et al. | 705/3 |
| 2002/0178213 A1 * | 11/2002 | Parry | 709/203 |

OTHER PUBLICATIONS

U.S. Appl. No. 09/785,433, filed Feb. 20, 2001, Pending.
U.S. Appl. No. 10/294,607, filed Nov. 15, 2002, Pending.
U.S. Appl. No. 09/785,433, filed Feb. 20, 2001, Pending.
U.S. Appl. No. 10/243,643, filed Sep. 16, 2002, Pending.
U.S. Appl. No. 10/243,645, filed Sep. 16, 2002, Pending.

(Continued)

*Primary Examiner*—Jingge Wu
*Assistant Examiner*—Shefali Patel
(74) *Attorney, Agent, or Firm*—Oblon, Spivak, McClelland, Maier & Neustadt, P.C.

(57) ABSTRACT

A system, method and computer program product for managing documents. The system includes a document manager that is configured to search for application services providers (ASPs) over a network and based on a user input. The document manager can search documents within the ASPs, retrieve documents and URLs, store documents and data, format documents, generate and issue unified bills from a plurality of bills from a plurality of ASPs. The document manager can also manage, e.g. create, receive, transmit, store, merge, watermark information for documents managed by the document manager. The document manager can request that a document be merged with a corresponding watermark information so that the document be printed with an embedded watermark. Alternatively, the document manager can merge the watermark information with the document and can transmit the merged document data to a printing entity.

75 Claims, 20 Drawing Sheets

OTHER PUBLICATIONS

U.S. Appl. No. 09/785,433, filed Feb. 20, 2001, Pending.
U.S. Appl. No. 09/949,969, filed Sep. 12, 2001, Pending.
U.S. Appl. No. 09/785,433, filed Feb. 20, 2001, Pending.
U.S. Appl. No. 09/839,221, filed Apr. 23, 2001, Pending.
U.S. Appl. No. 09/840,155, filed Apr. 24, 2001, Pending.
U.S. Appl. No. 10/116,162, filed Apr. 5, 2002, Pending.
U.S. Appl. No. 09/785,433, filed Feb. 20, 2001, Pending.
U.S. Appl. No. 09/839,263, filed Apr. 23, 2001, Pending.
U.S. Appl. No. 09/684,965, filed Oct. 10, 2000, Pending.
U.S. Appl. No. 09/795,438, filed Mar. 1, 2001, Pending.
U.S. Appl. No. 09/785,433, filed Feb. 20, 2001, Pending.
Printout of Web Page of digimarc.com, printed Jan. 9, 2001, 1 page.
Printout of Web Page of whatis.techtarget.com, printed Jan. 8, 2001, 3 pages.

* cited by examiner

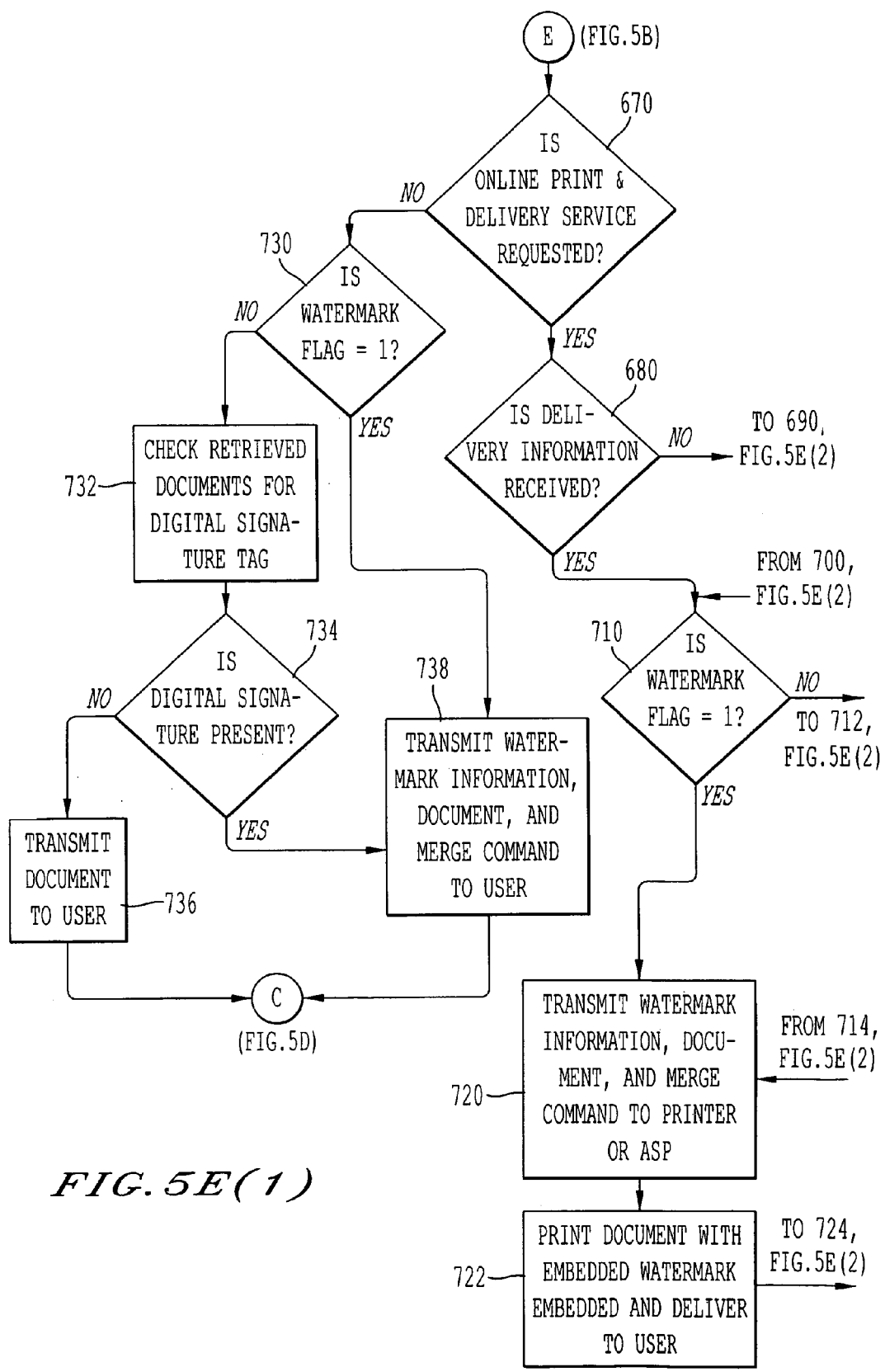
FIG.5E(1)

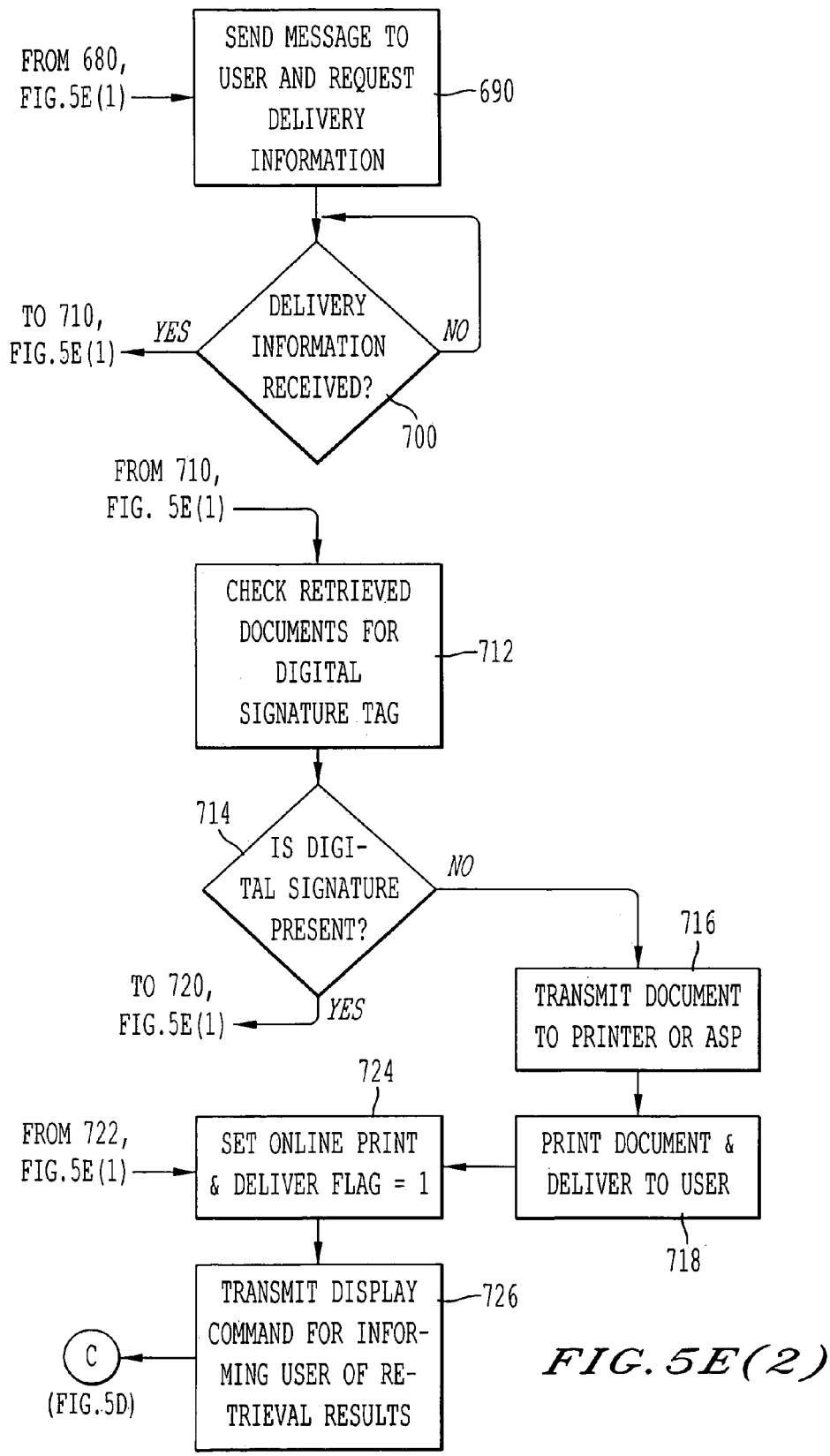
FIG.5E(2)

US 7,142,690 B2

SYSTEM, COMPUTER PROGRAM PRODUCT AND METHOD FOR MANAGING DOCUMENTS

BACKGROUND OF THE INVENTION

1. Field of the Invention

The present invention is directed to methods, computer-based systems and computer program products for managing documents or files.

2. Discussion of the Background

An application service provider (ASP) is an entity, typically a company, that offers users (individual customers, companies, enterprises, etc.) access over a network, such as the Internet, to applications and related services that would otherwise have to be located on the customer's local computer. For example, ASPs can provide searchable databases of legal, medical, financial, educational, scientific, or marketing documents. Alternatively, some companies provide in-house type ASPs wherein applications are not on the company's employee's personal computers, but instead on a company computer accessible by the employees via a company network. For the purpose of this document, the term "ASP" is thus intended to be broadly interpreted and to include a provider that allows a user to use an application not loaded on the user's computer.

An example of a conventional network of ASPs connected via the Internet is shown in FIG. 1, which shows four exemplary document ASPs 10–40 connected to an Internet 50. In this example, a user 70 may independently connect to the ASPs 10–40 via the Internet 50 and download documents, either to view on the screen of a personal computer (PC) 80, to print with a printer 90, to store in a local storage device 100 and/or a medium drive 110.

Today, there are a great number of ASPs providing various kinds of services and documents. For example, an ASP may provide legal documents, while another may provide marketing documents, yet another may provide educational, scientific, financial, or medical documents, etc. Furthermore, different ASPs may provide these documents in different formats, for example, using different graphical user interfaces (GUIs). When a user needs different kinds of documents, for example, a legal document, a financial document, a scientific document, and each of which is stored in different ASPs, the user must search, find and access an ASP that provides the desired documents. When a number of different kinds of documents are desired, the user may have to search, find and access several ASPs. This multiple searching requirement is time consuming for the user. In addition, because various ASPs may provide documents using different formats, the user may have to re-format the documents so as to obtain documents of a single format. This re-formatting is also burdensome on the user. Because most ASP charge their customers for their services rendered, typically on a pay-per-use basis or a contract basis, the customers, or users, may have to pay several bills, one for each ASP used. This multiple billing system thus imposes an extra burden on the user.

In an effort to alleviate these problems, a system, computer program product and method of managing documents retrieved from, or stored to, ASPs were disclosed in commonly owned co-pending U.S. patent application Ser. No. 09/684,965, which is incorporated herein by reference.

The management system, computer program product and method disclosed in Ser. No. 09/684,965 are configured to, inter alia, search for ASPs over a network and; retrieve documents, URLs and other data; store documents and data at the ASPs, within a document manager, or at the user; format documents; generate and issue unified bills from a plurality of bills from a plurality of ASPs. The document manager can provide consulting advice to the user regarding document managing, and can manage the stored documents.

In order to provide some security management of documents, Ser. No. 09/684,965 discloses associating an access level with documents stored at the ASPs so as to identify which documents a specific user can access via the document manager. While this access level scheme may be satisfactory for some applications, it may not be suitable for all document management systems because once a person who can access the documents (a person having the access level of the document) makes copies of the documents and distributes the copies, it becomes difficult to manage the security of the document. In addition, the security of the system may be compromised when users lose or forget their access levels, when authorized users become un-authorized, or when unauthorized users acquire, either by fraud or mistake, the access level of authorized users.

SUMMARY OF THE INVENTION

Accordingly, one object of the present invention is to provide a method, a system and a computer program product to manage the distribution of sensitive documents to unauthorized users.

To achieve this and other objects, the present invention provides a computer based system configured to manage documents between users, ASPs, and a document manager. The system according to the present invention typically includes a computer program, which receives data from users, and/or ASPs, transforms the received data in some desired way, and then outputs the transformed data stream to users and/or ASPs. For example, the computer program can receive and output a request for searching, retrieving or saving a document. The computer program can receive and output information from the users such as user I.D.s, documents (e.g. scanned by the users), names (e.g., of documents, users, or authors), addresses (e.g., street, P.O. Box, or e-mail addresses), phone numbers, dates and times (e.g., of document creations or document requests), serial numbers (e.g., of the device that scanned the document), and other watermark information. The computer program can receive and output information from the ASPs such as requested documents, documents' names, URLs, authors' names, retrieval and printed dates, watermark information. The computer program can identify watermark information received from the ASPs and users. The computer program can manage that the watermark information, for example by storing it, merging it with a document, requesting a merge command for the watermark information with a document, by transmitting the watermark information to other devices for printing on documents, or for saving. The computer program can also encrypt and decrypt the information received and provided to the ASPs and users.

To achieve the above objects, the present invention can also include a computer program that receives data from a document manager and/or a multi-function device, which may include a copier, a scanner, a printer, and/or a facsimile apparatus. The computer program transforms the received data in some desired way, and then outputs the transformed data stream to the document manager.

BRIEF DESCRIPTION OF THE DRAWINGS

FIGS. 5A–E and 5H show flowcharts of a method of managing documents implemented by a document manager according to one embodiment of the present invention.

DESCRIPTION OF THE PREFERRED EMBODIMENTS

Figure 1:
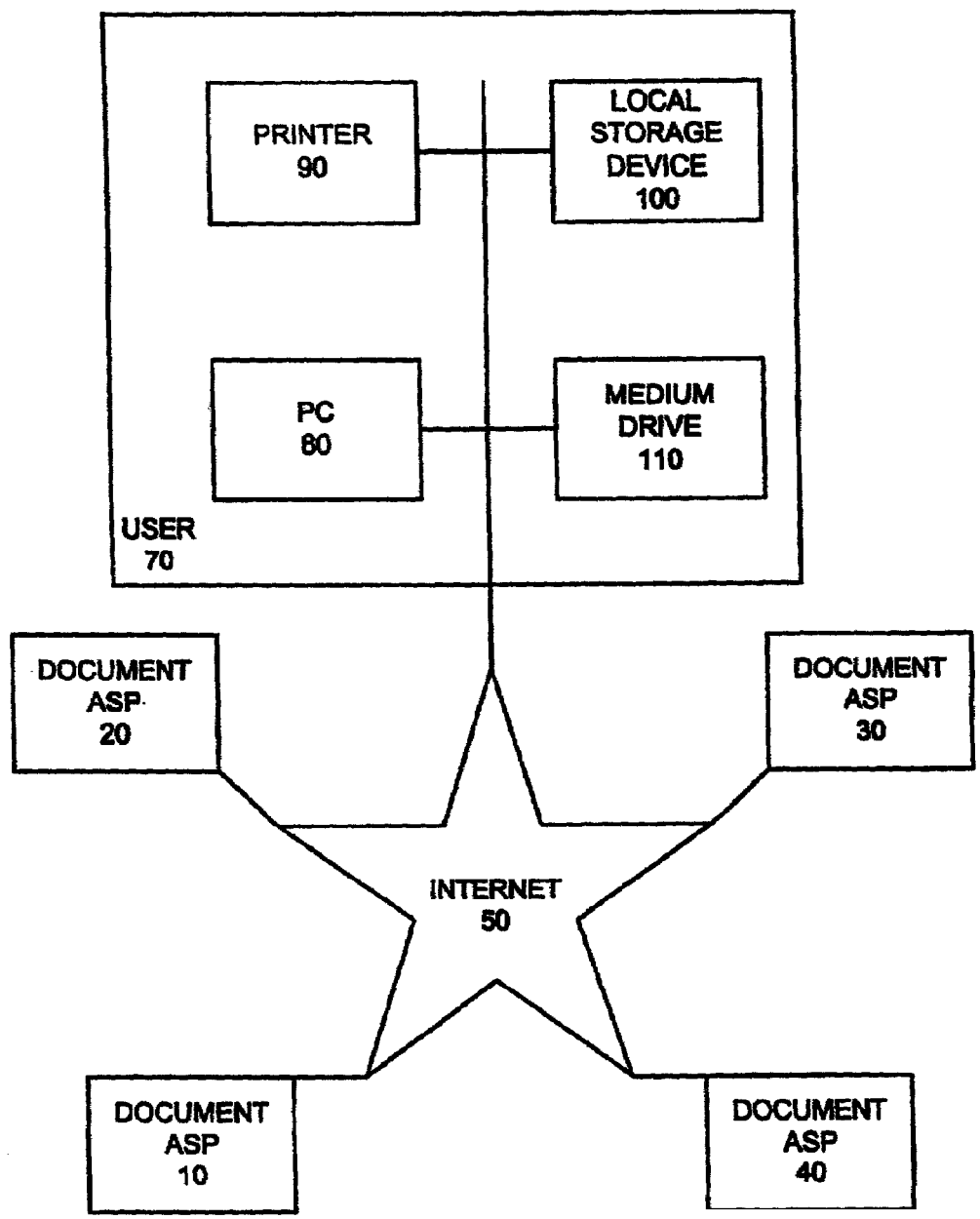
FIG. 1 is a block diagram showing a conventional ASP/user network.
Figure 2:
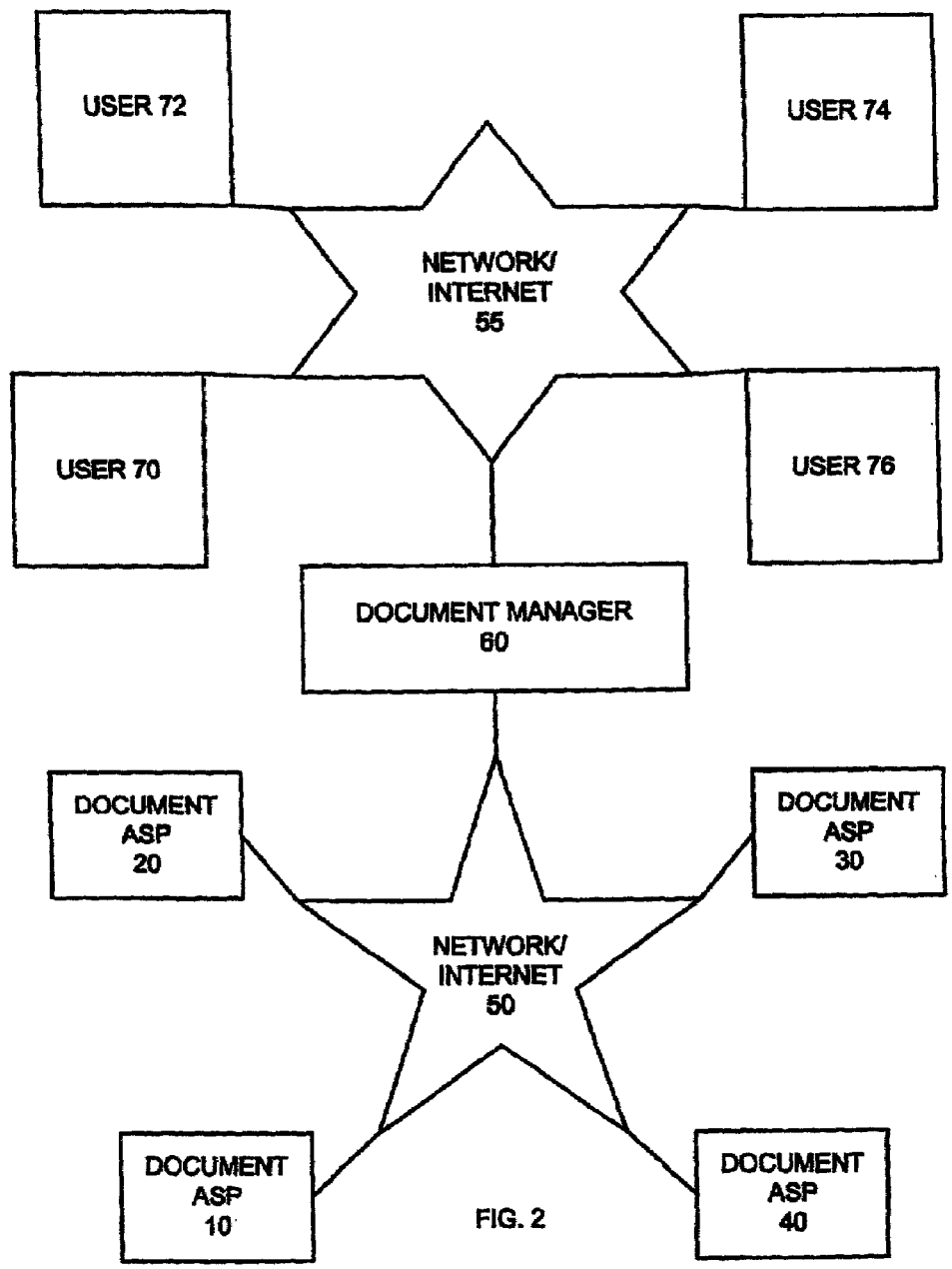
FIG. 2 is a block diagram showing an overall system configuration according to the present invention.

Referring now to the drawings, wherein like reference numerals designate identical or corresponding parts throughout the several views, FIG. 2 is a block diagram of a system for managing documents according to the present invention, and in particular to provide a security management of documents retrieved from, and stored in ASPs. The system includes a network 50 that interconnects at least one, but preferably a plurality of ASPs 10–40, a document manager 60, and at least one user 70, but preferably a plurality of users 70, 72, 74 and 76 connected to the document manager 60 via a network 55. The users 70, 72, 74 and 76 are thus remote users with respect to the document manager 60. The networks 50 and 55 are preferably the Internet, but can also be a local area network, a wide area network, any type of network such as an intranet, an extranet, or a combination thereof. An extranet may be used to provide controlled access to external users, for example through the Internet. How the users 70 and the document manager 60 can be connected to the Internet 50 and 55 is well-known in the art and is explained for example, in part 38 of "How Computers Work", by Ron White, Que Corporation, pps. 340–349, September, 1999, ISBN: 0-7897-2112-0, the entire content of this book being incorporated by reference. Other communications links for the networks 50 and 55, such as a virtual private network, or a wireless link, may be used as well.

Figure 3:
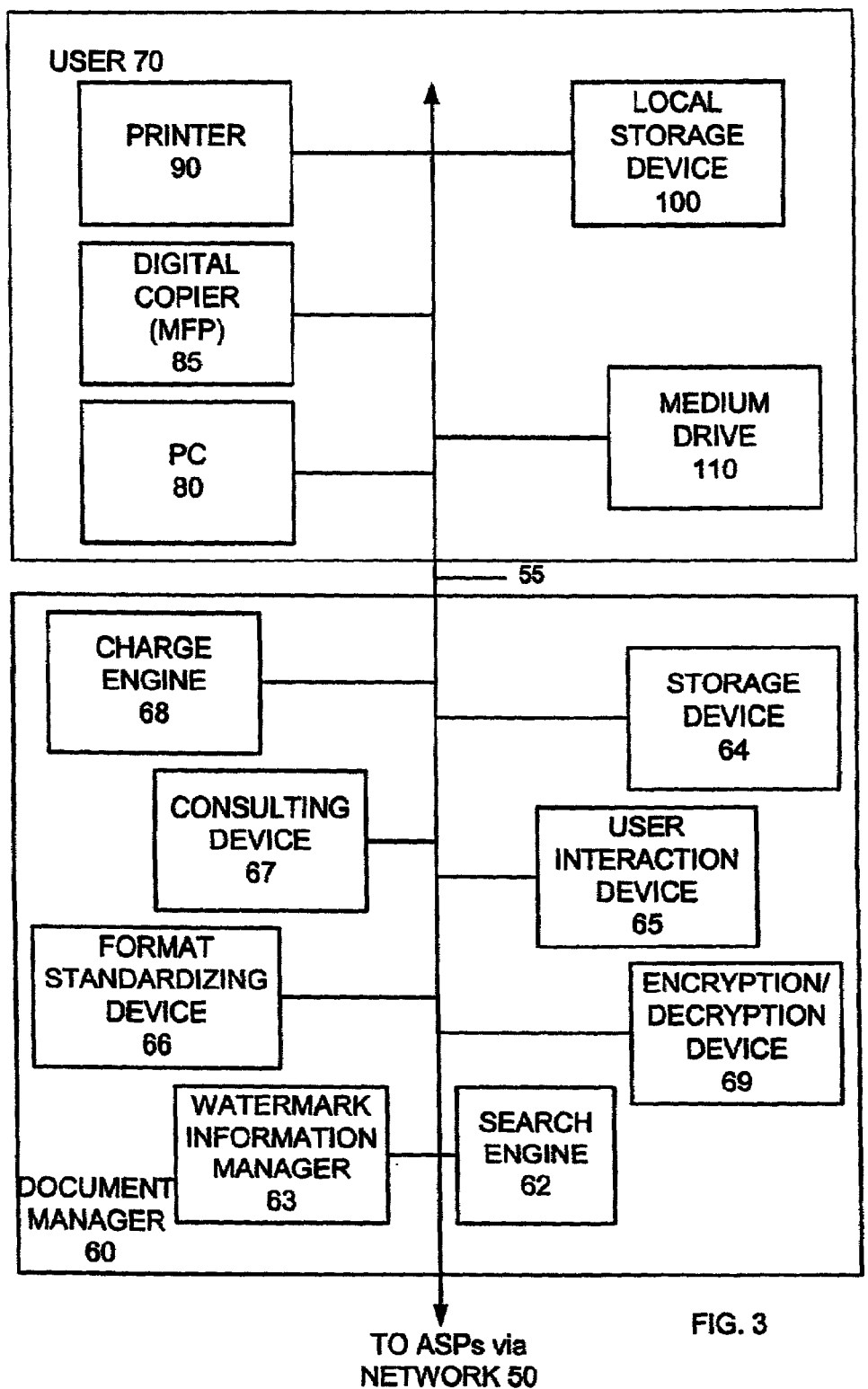
FIG. 3 is a block diagram illustrating a document manager and the user according to one embodiment of the present invention.

FIG. 3 is a block diagram illustrating the user 70 and the document manager 60 in more detail. As further described below, the document manager 60 and its components may be implemented using any desired structure such as a programmed general purpose computer, server, a combination of a server with other computers, or using any desired hardware, and any desired software or firmware. As shown in FIG. 3, the user 70 (and similarly users 72, 74 and 76) can include a PC 80, a digital copier 85, i.e. a Multi-Function Printer (MFP), a printer 90, a local storage device 100, or a medium drive 110, or a combination of such devices. Alternatively, the users 70, 72, 74 and 76 may also include other local storage devices such as the Ricoh eCabinet™.

In the embodiment shown in FIG. 3, the user 70 may interact (exchange data) with the document manager 60 via the user interaction device 65 through the network/Internet 55, so as to benefit from a number of services provided by the document manager 60. For example, the user 70 may provide the document manager 60 with the user I.D., a document, the name of a document scanned by the digital copier 85, the name of the person scanning the document, the name of the author of the document, the date and time of the scanning, the version of the document, the digital device 85's serial number and/or location.

In a preferred embodiment, some of the information received by the user interaction device 65 is identified by a watermark information manager 63 as watermark information. The watermark information manager 63 manages watermark information. For example, the watermark information manager 63 can receive, save, transmit, request, merge watermark information. In one embodiment, the watermark information manager 63 transmits the watermark information to ASPs for storage. In another embodiment, the watermark information manager 63 saves the watermark information in a storage device at the document manager 60 (for example a storage device 64 described below). In the present application, the watermark information can include information that permits tracking the distribution of the document, and/or that permits identification of the printed document as belonging to a certain type of document, such as sensitive documents. For example the watermark information may include the document's name or file name, the originator of the document, the version of the document, the user I.D., the retrieval and printed date, the MFP's serial number and/or the MFP's location.

The watermark information managed by the watermark information manager 63 may be used to tag certain or all documents. The tagging of a document is performed by the watermark information manager 63 by transmitting the watermark information with the document to another device. In a preferred embodiment, the watermark information manager 63 can tag a document by transmitting the watermark information with the document to a printer and a merge command requesting the printer to execute the merge command and print the document with the watermark information. In another embodiment, the printer does not performing the merging function, and the document manager 60 merges the watermark information with the document, and transmits the merged document to the printer for printing. In this other embodiment, the printer performs the printing operation for the transmitted data without distinguishing the watermark information and the document.

In a preferred embodiments, the watermark information manager 63 tags all sensitive documents with the watermark information, for example all digitally signed documents. In a preferred embodiment, a tagged document can only be saved or printed with the watermark information. In this manner, the distribution of sensitive documents can be tracked and monitored, so as to provide an additional level of security. The watermark information manager 63 can also process watermark requests from users. For example, upon receiving the user's watermark request, the watermark information manager 63 can set a variable (e.g., a watermark information flag) to a particular value (e.g., 1) and the document manager 60 can transmit a document with watermark information to a user's printer and transmit a merging command. The watermark information manager 63 can also recognize that a document has been tagged, for example with a digital signature tag. Once the watermark information manager 63 recognizes the tagging, the document is transmitted (e.g., to the user's printer) with watermark information, either with the merging command or already merged in the document.

In one embodiment, the document manager 60 receives (either from the user 70 or the ASPs 10–40) watermark information in an encrypted format and the document manager's encryption/decryption device 69 decrypts the watermark information. In another embodiment, the document manager 60 receives unencrypted watermark information and encrypts it with the encryption/decryption device 69. In this case, the encrypted watermark information can be saved either in the document manager 60 and/or at the ASPs, and/or on one of the user's storage devices. The document itself from the ASPs and users may be encrypted and the encryption/decryption device 69 can decrypt it as desired. Encryption/decryption devices include special purpose hardware and/or computer programs that are well-known in the art and are discussed for example, in part 49 of "How The Internet Works", by Preston Gralla, Que Corporation, pps. 185–189, August 1999, ISBN: 0-7897-2132-5, the entire content of this book being incorporated by reference. The encryption/decryption device 69 according to the present invention can be based on asymmetric, or public-key, cryptography (based on a public/private key pair system), or can be based on symmetric cryptography (based on the creation and sharing of private keys).

In another embodiment, the document manager 60 can provide the user 70 consulting services via the consulting device 67 regarding document management in general.

As noted above, the document manager 60 includes a user interaction device 65 with which the user 70 can interact via network, and some of the information entered by the user 70 can ultimately be used as part of the watermark information. In one embodiment, the user interaction device 65 also lets the user 70 access the document manager 60 by signing on, for example using a user-name and a password, which can be verified by the user interaction device 65. If the user is not a registered user, the user interaction device 65 can request information from the user so as to generate a membership. The user interaction device 65 also receives the input data from the user 70 regarding the type of documents the user is requesting or sending for storage, the requested format of the document, the name of a document scanned by the user, the version of the document, the user's e-mail addresses, postal addresses, telephone numbers. The user interaction device 65 can also request more information from the user and/or provide the user 70 with document managing advice, strategies, and information, for example via the consulting device 67. The user interaction device 65 may also provide the user with the ASPs addresses from which requested documents are available, or may transmit to the user 70 the requested documents with or without watermark information, and the unified bill.

The document management 60 also includes a search engine 62 configured to search and access ASPs based on data input from the user 70, for example via the user interaction device 65. The search engine 62 is also configured to retrieved documents. Advantageously, the user need only input information related to the document required and not related to the ASP from which the desired document is to be retrieved. The search engine 62 can also be configured to search the individual ASPs for documents when the ASPs do not have a search engine available. Search engines are well-known in the art and are explained for example, in part 32 of "How The Internet Works", by Preston Gralla, Que Corporation, pps. 185–189, August 1999, ISBN: 0-7897-2132-5, the entire content of this book being incorporated by reference.

The document manager 60 also includes a storage device 64, which may store documents requested by the user 70, in their original formats and/or in their standardized format. The storage device 64 may also store documents' watermark information, URLs, and/or the billing information from each ASP from which the searching engines retrieved documents. The storage device 64 may store user information, such as user-names, user passwords, e-mail addresses, postal addresses, telephone numbers, current and prior type of documents requested, current and prior document management strategies for specific users, current and prior user-requested searches, and/or searching parameters. In a preferred embodiment, the storage device 64 stores the user I.D., the name of a document scanned by the digital copier 85, the name of the person scanning, the date and time of the scanning, the version of the document, the digital copier 85's serial number and/or location, the date and time of the document retrieval from an ASP. In one embodiment, portions of the information stored in the storage device 64 is directly accessible by the user, for example via the user interaction device 65.

The storage device 64 can include, but is not limited to, any type of disk including floppy disks, optical disks, CD-ROMs, magneto-optical disks, ROMs, RAMs, EPROMs, EEPROMs, Flash Memory, Magnetic or Optical Cards, or any type of media suitable for storing electronic instructions and/or data. Moreover, the storage device 64 may include a database, i.e., a digital repository, that may be implemented, for example, through a commercially available relational database management system (RDBMS) based on the structured query language (SQL) such as ORACLE, SYBASE, INFORMIX, or MICROSOFT ACCESS, through an object-oriented database management system (ODBMS), or through custom database management software.

The document manager 60 may also include a format standardizing device 66 configured to standardize the formats of the documents retrieved from various ASPs. For example, the format standardizing device 66 can re-format the documents so that they may be accessed using a single GUI. Such re-formatting devices are well-known in the art. In one embodiment, the format standardizing device 66 receives the standard format from the user interaction device 65 and stores the standardized documents in the storage device 64. The documents to be formatted by the format standardizing device 66 can be received from the ASPs via the network 50, from the user 70 via the network 55, from the storage device 64, or from the user interaction device 65.

The document manager 60 may also include a charge engine 68 configured to charge the user 70 with a bill which may be a unified bill. For example, the unified bill can correspond to the sum of the bills received from the ASPs. The bills from the ASPs can be received from the ASPs or the user interaction device 65, and can be forwarded to the user interaction device 65, or to the storage device 64 for storing, or to the user 70 via the network 55.

The document manager 60 described above can provide security management of documents, consulting advice to the user, generate document managing strategies for the user based on the user's specific needs, retrieve and organize the addresses of, and links to, ASPs 10–40, retrieve documents from the ASPs 10–40, store the documents, format the documents, bill the user a unified bill, and/or transmit the documents to the user to be viewed on the screen of the PC 80, printed with the printer 90, or stored in the local storage device 100 and/or the medium drive 110. The document manager 60 thus provides the user with access-to-ASP services, the ability to retrieve-from-ASPs, a consistent user interface, a single sign-on service, the ability to request a single search for different documents and different document types, a single billing service, and a flexible storage service, while at the same time providing a secure way to track the printing and storing of sensitive documents.

In a preferred embodiment, the document manager 60 permits the user to retrieve documents (with or without watermark information) and to store the documents on a local storage device, either permanently or temporarily. Alternatively, the document manager allows the user 70 to store a document at the ASP (with or without watermark information). For example, the document manager 60 may be in a partnership with the ASPs to provide storage at the ASPs for documents of users, i.e. customers, of the document manager 60. For instance, a user may decide to store sensitive legal documents, insurance contracts, or digital certificates on a local storage device for a predetermined period of time, and have the documents protected from loss, theft, fire, disaster, etc. by storing them at an ASP, which may provide better protection for the secured documents. The document manager 60 ensures that the stored sensitive documents are stored with watermark information transmitted by the watermark information manager 63. For example, sensitive documents stored in the ASPs can be tagged with a digital signature tag. When the document manager 60 retrieves the tagged document and the document is transmitted with the watermark information so as to be printed (e.g., at the user's printer, or at a printing service, then delivered to the user) with the watermark information. The sensitive document is thus ultimately printed with a watermark. In this case, the user benefits from the ASP's know-how for handling and protecting secured documents and the system permits the tracking of the sensitive documents. In this embodiment, the ASP can charge a fee for the storage. In one embodiment, such a fee would be included in a unified bill computed by the document manager for the benefit of the user.

The document manager 60 may also suggest to the user and provide the user with online print and delivery services, for example by ordering documents from the ASPs and securing their delivery to the user via a courier. In this embodiment, the document manager 60 can contract with the ASPs and the courier service to ensure proper delivery, to be the user's agent that keeps track of the delivery, and to inform the user of the status of the delivery. The document manager 60 can also generate a single bill for its services and those of the ASP and courier used.

The document manager 60 may also provides the user 70 with the links to the ASP documents so that the user may access the documents (with or without watermarks embedded in the documents) via the document manager 60 without having to store any document at the computer of the user, nor at the document manager 60, if desired. In this respect, the user 70 benefits from the searching, retrieving and storing know-how of the ASPs. In this embodiment, the ASP can charge a fee for access to their documents. In one embodiment, the fee may be incorporated into a unified bill generated by the document manager 60 and provided to the user 70 for its benefit. The term "unified bill" herein means a bill that includes the charges of at least two bills.

Advantageously, the user does not have to be aware of the different ASPs used by the documents manager 60 to create the collection of documents retrieved and transmitted to the user, and used to store documents at the ASPs. Therefore, the user may deal with a single user interface when receiving the requested documents and when transmitting the user documents to be stored at the ASPs. In addition, the unified billed, generated by the ASPs for either searching, delivering, or storing documents, provided by the document manager 60 also alleviates the burden on the user 70 to pay several different bills.

The document manager 60 thus provides a single stop for consulting, billing, formatting, obtaining, reviewing, storing, and managing a variety of types of documents, all with an additional level of security provided by the watermarks managed by the watermark information manager 63.

Figure 4:
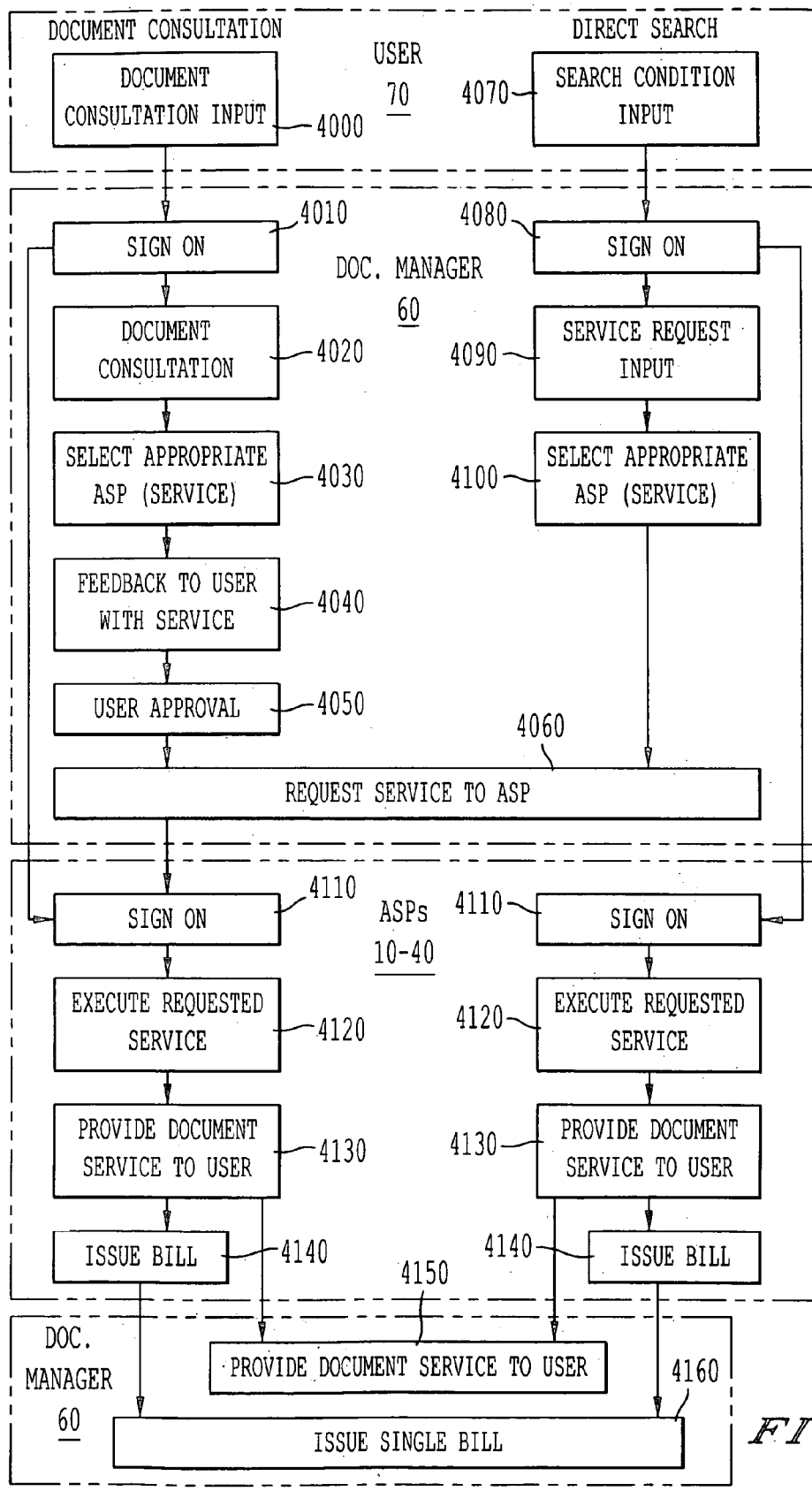
FIG. 4 is a block diagram illustrating the functionality of a system according to one embodiment of the present invention.

FIG. 4 is a flowchart showing the functionality of the document management system according to one embodiment of the present invention. As shown in the embodiment of FIG. 4, the document manager 60 offers the user 70 at least two types of services. As illustrated on the left of the diagram, the user 70 can access the document manager 60 for document consultation, and as illustrated on the right the user 70 can access the document manager 60 for a direct search. For the document consultation service, the user 70 inputs data related to the type of document consultation requested at step 4000, for example, the type, number, format of documents needed, the budget available for the service, the time constraints for completing the service, the level of security required, etc. At step 4010, the user 70 signs on the document manager 60, for example by providing a user-name and password. Once the user is signed on, the document manager 60 performs a document consultation at step 4020, for example, with the consulting device 67, which can generate a strategy for the service requested based on the inputted information from the user 70, or by asking further questions. Based on the document consultation, the document manager 60 selects the ASPs appropriate for the service requested by the user 70 at step 4030. The document manager 60 sends the user 70 feedback on the selection of the ASPs, at step 4040 for example indicating the costs and time of the service. Upon approval from the user 70 at step 4050, the document manager 60 requests the service from the ASPs at step 4060.

For the direct search service, the user 60 can input the search requested at step 4070. At step 4080 the user signs on the document manager and the user request is inputted at step 4090. The document manager 60 then selects the ASPs appropriate for the requested service at step 4100 and requests the service from the ASPs at step 4060.

For both services, the document manager signs on to the ASP to request the service at step 4110. In other words, if the user signs on the document manager 60, the user can access several ASPs without signing on each ASP. Once the ASPs receive the requested service, the ASPs perform (execute) the service at step 4120, for example, search for a specific document, provide the document (with or without watermark information) to the user at step 4130 and bills the document manager 60 at step 4140. The document manager 60 then provides the document(s) (with or without watermark information and merge command) to the user 70 at step 4150 and issue a single bill to the user for all services performed at step 4160.

For both services, the user 70 has the option of signing-on the document manager 60 at step 4010 and 4080 and the ASPs 10–40 at step 4110 and placing the request. This may be beneficial when the user knows which ASP can provide the desired service. In this case, the document manager 60 can still perform the services of managing watermark information, issuing a single bill, or reformatting the documents in accordance to the user's requested format, and/or securing the proper delivery of the document to the user, etc.

Figure 5A:
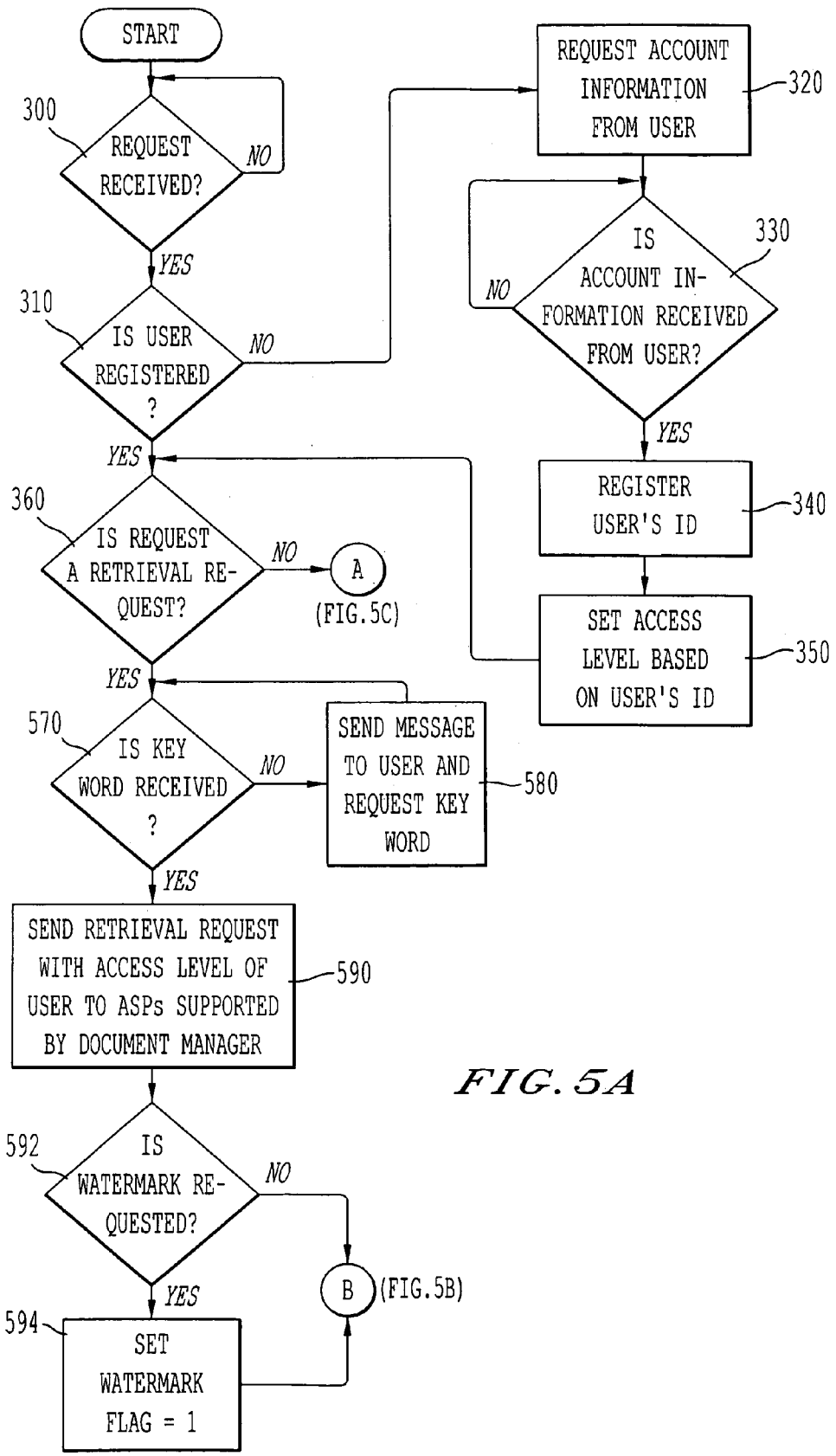

FIGS. 5A–E show flowcharts illustrating a method of managing documents according to one embodiment of the present invention, which can be implemented by the system shown in FIGS. 2–3 and 7–8. As shown in FIG. 5A, in step 300 the document manager 60 inquires whether a request is received, e.g. from a user input. If no request is received, the document manager 60 loops and returns to step 300. Otherwise, the document manager 60 inquires at step 310 whether the user is a registered user. If the user is not registered, the document manager requests account information from the user at step 320. At step 330, the document manager checks that the account information has been received. If the information is not received, the document manager loops and returns to step 330. If the information is received, the document manager 60 registers the user's ID at step 340 and sets the access level based on the registered user's ID at step 350.

The access level used by the method of the present invention is described next As noted above, the document manager 60 permits storing of documents at the ASPs 10–40. In other words, the user 70 may transmit documents to the ASPs 10–40 for storage via the document manager 60. These documents may be downloaded from the user's local storage device 100 or medium drive 110, or generated by the user's PC 80, digital copier 85, or a facsimile machine, a printer, or some other multi-function device connected to the network 55. In a preferred embodiment, the documents stored at the ASPs 10–40 are stored with an access level associated with them. The access level identifies the documents which a specific user can access at the ASPs via the document manager 60. The user 70 may assign an access level to each document stored at the ASP. During a retrieval operation, the user's ID is transmitted to the document manager 60 so that the user's ID can be registered at step 340 and an access level set based on the user's ID at step 350. Because the access level is assigned to each user, the document manager 60 retrieves documents that match the user's access level. As a result, some level of security management can be accomplished and the search time can be reduced. The access level for each user can be stored in the document manager 60, for example in storage device 64. When documents are stored in the ASPs, the access level can be set with each document. The access level for each stored document can be stored at the ASPs. When the document manager 60 executes a document retrieval operation, the document manager's search engine 62 and/or the ASPs' search engine execute the retrieval operation only for documents having an access level matching the user's access level. Consequently, the retrieval time is shortened and high security documents can be accessed by appropriate users.

Returning now to FIG. 5A, the document manager 60 inquires whether the request is a request to retrieve a document from an ASP at step 360. If the request is not a request to retrieve a document, the document manager 60 inquires at step 370 (see FIG. 5C) whether the request is a request to store a document in an ASP. If the request is not a storage request, the document manager's routine can end. If the request is a storage request, the document manager 60 inquires at step 380 whether the document to be stored has been received form the user. If not, the document manager 60 contacts the user at step 390 to inform the user that the document was not received and to request the user to send the document. Once the document is received, the document manager 60 inquires at step 400 whether the access level for the document was received. If the access level was not received, the document manager 60 sends a message to the user at step 410 to ask for the access level of the document. Once the access level of the document to be stored is received by the document manager 60, the document manager 60 sets the access level to the document at step 420. The document manager 60 then inquires at step 430 whether the type of document has been received. If the document type was not received, the document manager 60 sends a message to the user at step 440 to ask for the document type. Once the document type is received, the document manager 60 selects an ASPs at step 450 to store the document based on the document type. In one embodiment, the document manager 60 uses a table stored in storage device 64 to select the ASP for storage of the document. For example, the table associates all legal documents to be stored with a first ASP, all fiance documents with a second ASP, all insurance documents with a third ASP, all marketing documents with a fourth ASP, etc . . . At step 460, the document manager 60 sends the document to be stored to the selected ASP, along with the user ID, and the document access level.

Figure 5B:
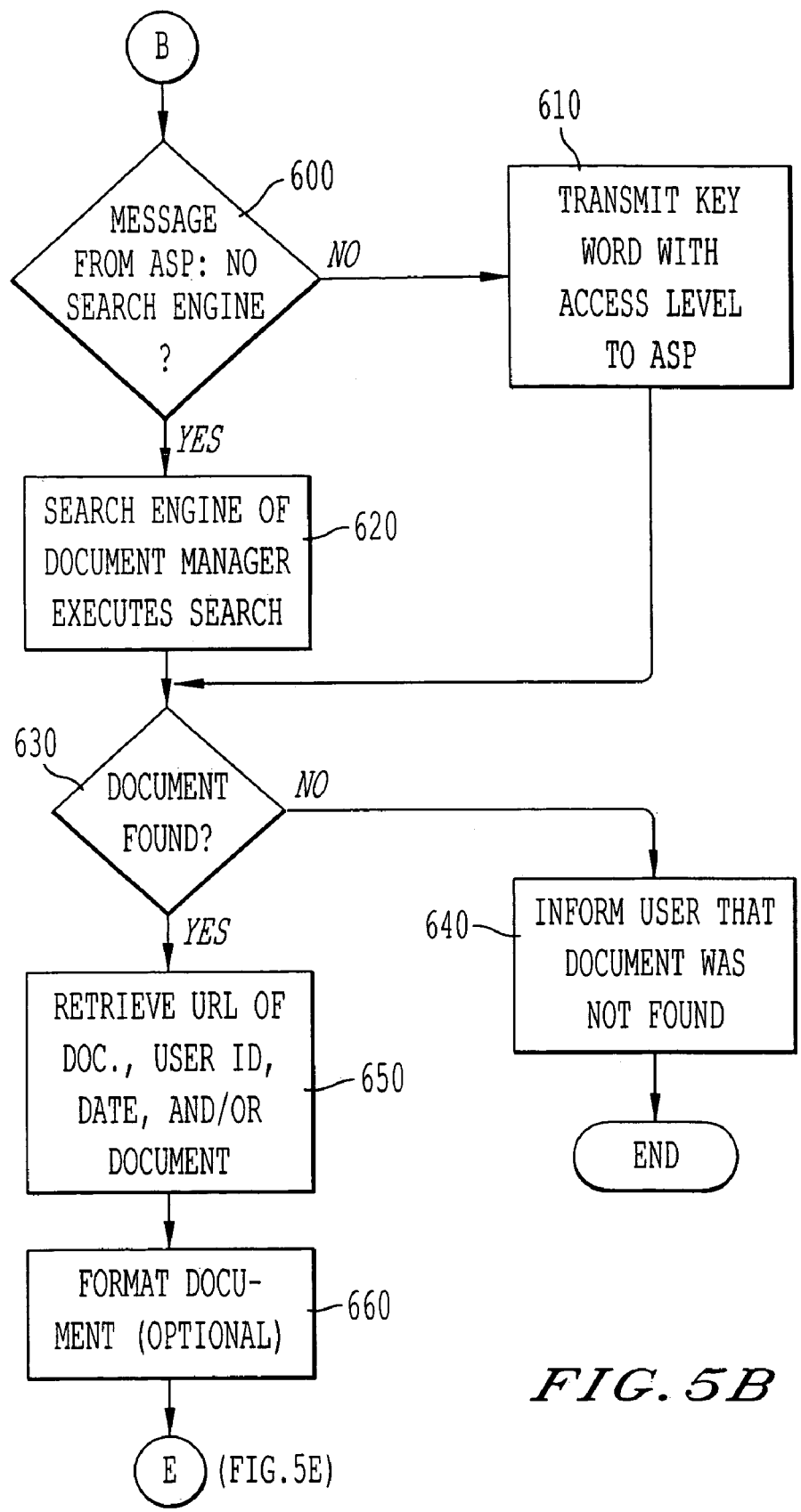
Figure 5C:
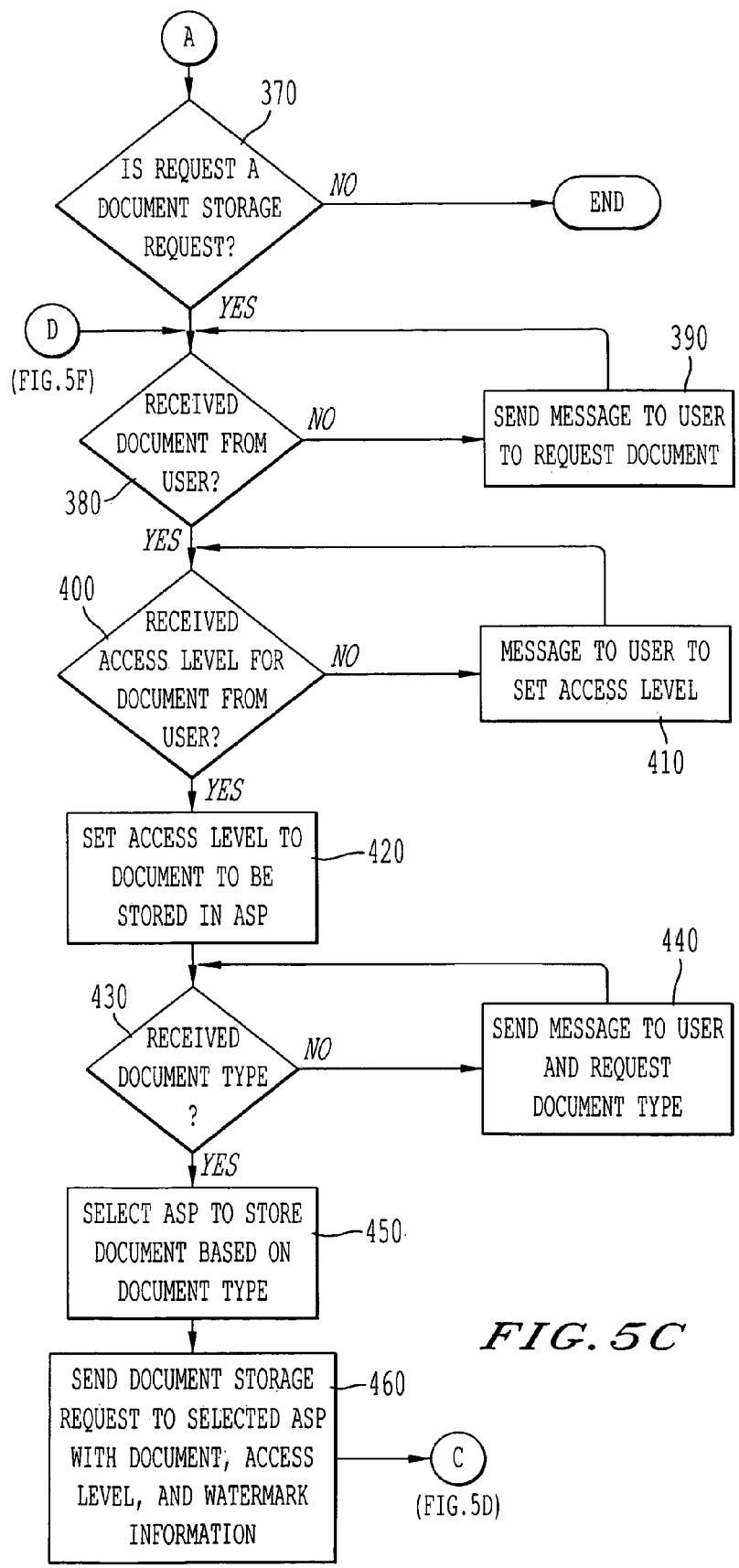
Figure 5D:
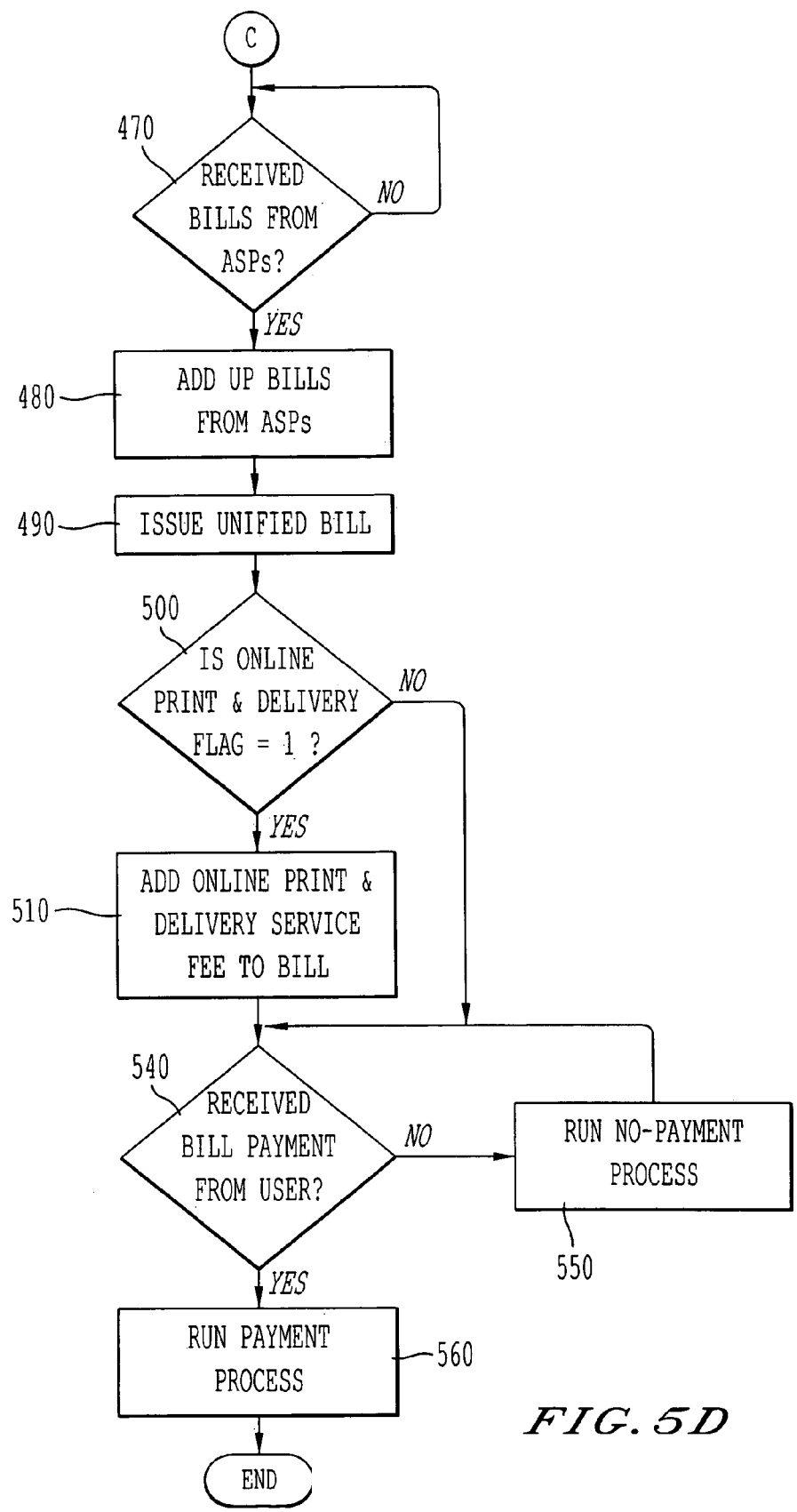

The document manager 60 then can go through a billing routine, for example as shown in FIG. 5D. At step 470 the document manager 60 inquires whether all bills have been received from the various ASPs. Once all bills are received, the document manager 60 adds up the bills at step 480, and issues a unified bill at step 490. At step 500, the document manager 60 checks if the online print and delivery service was performed, i.e., whether the online print and delivery flag is equal to one. The online print and delivery service is described in detail below. If the online print and delivery service was performed, then the document manager 60 adds an online print and delivery service fee to the bill at step 510. Otherwise, the program manager 60 goes to step 540 and inquires whether payment was received, either by the user or by a payment company contracted by the user. If no payment is received for the bill, the document manager 60 runs a no-payment process at step 550, for example sends a reminder to the user to pay the bill. If a payment is received for the bill, the document manager 60 runs a payment process at step 560, for example sends a receipt to the user. Once the unified bill has been paid by the user, the program manager 60 can end its routine.

Returning to step 360 of FIG. 5A, if the request received from the user is a request to retrieve a document, the document manager 60 inquires at step 570 whether a key word is received from the user. If no key word is received, the document manager 60 sends a message to the user at step 580 and asks for a key word. Once a key word is received, the document manager 60 sends the request for retrieving a document to the ASPs along with the access level of the user at step 590. At step 592, the document manager 60 inquires whether a watermark is requested. If no watermark is requested, goes on to step 600 (see FIG. 5B). If a watermark is requested, at step 594, the document manager 60 assigns a value (e.g., 1) to a specific variable (e.g., a watermark flag), then goes on to step 600 (see FIG. 5B).

Turning to FIG. 5B, at step 600, the document manager 60 inquires at step 600 whether a message from any ASP informing the document manager 60 that the ASP does not have a search engine. If no such message is received, the document manager 60 sends the key word with the access level of the user to the ASPs at step 610. Otherwise, at step 620, the document manager's search engine 62 executes the search of the ASPs that don't have a search engine by matching documents with the key word and the access level. The document manager 60 inquires at step 630 whether a document was found. If no document was found, the document manager sends a message to the user at step 640 to inform the user that no document was found, and the document manager's routine can end. If a document was found, the document manager 60 retrieves and stores at step 650 the URL for the document from the ASP, the user's ID, and the retrieval date as the retrieval history. Optionally, the document manager 60 can retrieve and store the document itself, with its watermark information. Also optionally, the document manager 60 can re-format the documents at step 660 according to a format that the user requested. The requested format was either inputted during the present search (steps not shown) or in a previous search by the same user and saved as part of the retrieval history.

Turning to FIG. 5E, the document manager 60 inquires at step 670 whether an online print and delivery service is requested. If no online print and delivery service is requested, the document manager 60 inquires at step 730 whether a watermark was requested by the user, i.e., whether a variable (e.g., the watermark flag) is equal to a specific value (e.g., equal to 1). If no watermark was requested for the document, the document manager 60 checks for digital signature tags in the retrieved documents at step 732. A digital signature tag may be attached to the document either by the document manager 60 or by an ASP which has the capability of digitally signing the document and storing the signed document in a security storage device per the user's request. If no digital signature tag is found at step 734, the document manager 60 transmits the document to the user at step 736. If a watermark was requested for the document, or if a digital signature tag is found, the document manager 60 transmits the document to the user along with watermark information and a merge command at step 738. In an alternative embodiment, the document manager 60 merges the document with the watermark information and transmits the merged document at step 738. As previously noted, the watermark information may include the document's name, the document's originator, the document's version, the user I.D., the retrieval date and time. Using the above method, sensitive documents, such as digitally signed documents, can automatically be transmitted to a user with watermark information and a merge command. The method thus provides an advantageous way of tracking the distribution of transmitted documents. Once the document is transmitted to the user, either or without with the watermark information, the document manager 60 can go through a billing routine, for example as shown in FIG. 5D.

If an online print and delivery service is requested at step 670, the document manager 60 inquires at step 680 whether the delivery information has been received. The delivery information may include for example the user's e-mail address, street address, facsimile, or telephone number, etc. . . . If no delivery information was received, the document manager sends a message to the user at step 690 and requests the delivery information. The document manager 60 inquires at step 700 whether the requested delivery information is received. Once the delivery information is received, the document manager 60 in quires whether inquires at step 710 whether a watermark was requested, i.e., whether a variable (e.g., the watermark flag) is equal to a specific value (e.g., equal to 1). If no watermark was requested for the document, the document manager 60 checks for a digital signature tags in the retrieved documents at step 712. If no digital signature tag is found at step 714, the document manager 60 transmits the document to a printer or to an ASP at step 716. The document is then printed and delivered to the user at step 718. If a watermark was requested for the document, or if a digital signature tag is found, the document manager 60 transmits the document to a printer or an ASP along with watermark information and a merge command at step 720. In an alternative embodiment, the document manager 60 merges the document with the watermark information and transmits the merged document at step 720. As previously noted, the watermark information may include the document's name, the document's originator, the document's version, the user I.D., the retrieval date and time. The document is then printed with the embedded watermark and delivered to the user at step 722. In one embodiment, the document manager 60 prints out the document with the embedded watermark and delivers it to the user. In another embodiment, an ASP prints out the document with the embedded watermark and delivers it to the user. The delivery may be performed by a number of devices, for example via e-mail, facsimile, courier, or mail. Additionally or alternatively, an electronic representation of the document may be transmitted to a printing division or company such as Mineo.com, the document printed, and sent by a delivery service such as Federal Express to the user. Once the online print and delivery service is performed, the document manager 60 assigns at step 724 a value to the online print and delivery service flag, for example the value 1. At step 724, the document manager 60 transmits a display command to inform the user of the retrieval results. For example, the display command can include the URL of the searched document, the titles of the documents, the document itself, the expected date of delivery (if applicable), or any other information relating the search results. The display command may be displayed on the screen of the user's PC 80, or can be displayed as an e-mail to the user, or a facsimile to the user. Once the document is printed and delivered to the user, either with the watermark embedded in the document or not, the document manager 60 can go through a billing routine, for example as shown in FIG. 5D.

Using the above method, sensitive documents, such as digitally signed documents, can automatically be printed with an embedded watermark. The method thus provides an advantageous way of tracking the distribution of printed documents.

Figure 5F:
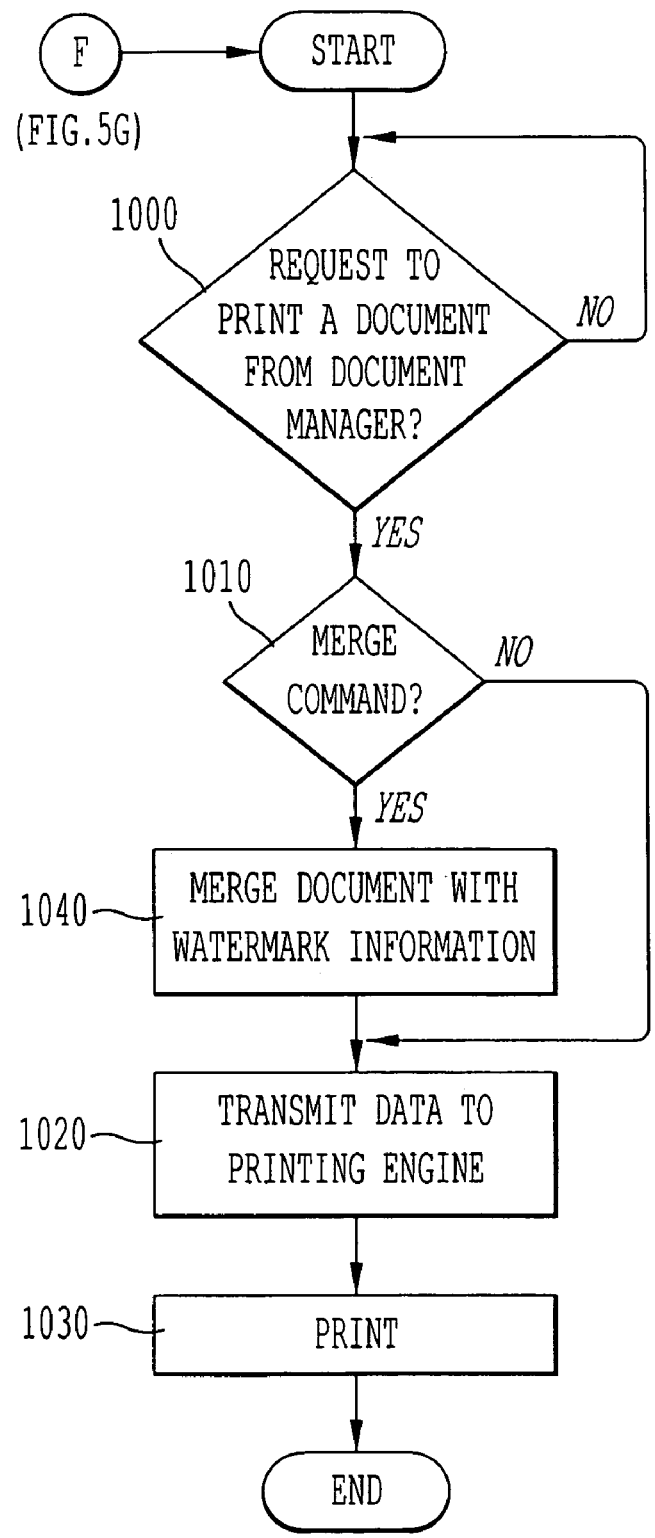
FIG. 5F shows a flowchart of a method of managing documents implemented by a printing device according to one embodiment of the present invention.

An example of a method of printing a document with watermark information is illustrated in FIG. 5F. At step 1000, the processor of the printing entity, such as the user's PC 80 (when the printing entity is a printer 90), the CPU of the user's digital copier 85 (such as an MFP), or the CPU of an ASP printing device, inquires whether a request to print a document is received. If a printing job is not requested, the processor loops until a request is received. When a request to print a document is received, the processor inquires at step 1010 whether a merge command is received. If no merge command is received, the processor transmits at step 1020 the document data received from the document manager 60 to a printing engine, which prints the data at step 1030. If a merge command is received, the processor merges the document data received from the document manager 60 with watermark information at step 1040. Some of the watermark information can be received from the document manager 60 and some can be obtained from the printing entity. For example, the processor can obtain the printer's serial number, the location of the printer, and/or the time and date of the printing from the printing entity. The processor transmits at step 1020 the data to be printed (document data and watermark information) to a printing engine, which prints the document with a watermark at step 1030.

Figure 5G:
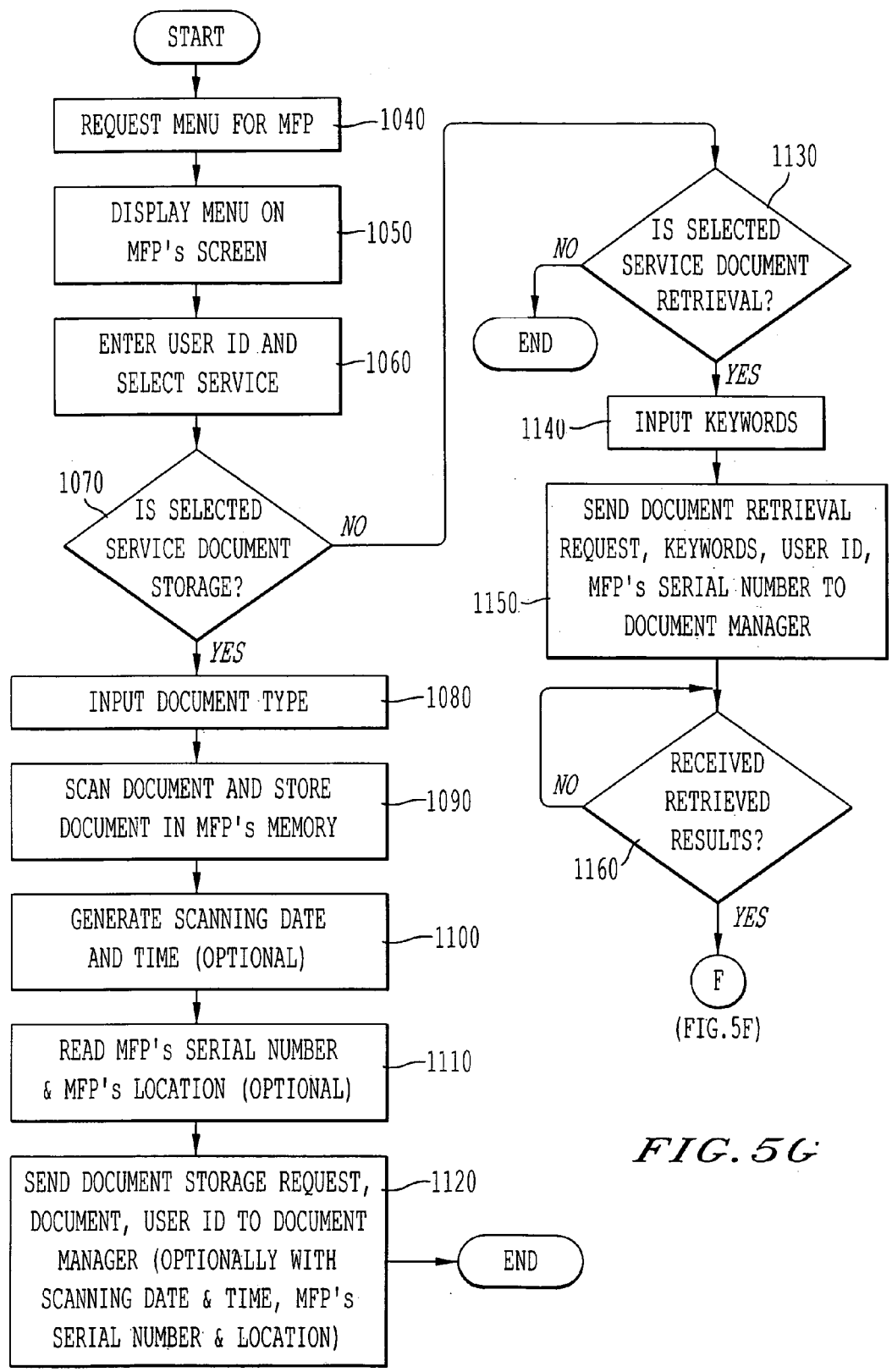
FIG. 5G shows a flowchart of a method of managing documents implemented by a multi-function device according to one embodiment of the present invention.

An example of a method of managing documents from a multi-function printer (MFP) used as digital printer 85 (FIG. 2) is illustrated in FIG. 5G. This embodiment permits users to use the document manager 60 from an MFP. At step 1040, the MFP requests a menu from the document manager 60. At step 1050, the MFP displays the menu on a display, such as an LCD screen. At step 1060, the MFP prompts the user to enter a user I.D. and to select a service. At step 1070, the MFP inquires whether the selected service is document storage. If the selected service is document storage, at step 1080, the MFP prompts the user to enter a document type. At step 1090, the MFP scans the document and stores it in the MFP's memory. Optionally, at step 1100, the MFP generates the date and time of the scanning. Also optionally, at step 1110, the MFP reads the MFP's serial number and the MFP's location. At step 1120, the MFP sends the document storage request, the document and user I.D. to the document manager 60 for storage purposes. Optionally, the MFP also sends the date and time of the scanning, the MFP's serial number and the MFP's location. Some of this data sent by the MFP to the document manager 60 may be ultimately used as watermark information for the scanned document. As noted above, the document manager 60 then selects, based on the document's type, an ASP for storing the document and possibly the watermark information. Alternatively, the document and the watermark information received from the MFP may be stored at the document manager 60.

Returning to step 1070, if the selected service is not document storage, at step 1130, the MFP inquires wether the selected service is document retrieval. As noted above, the document retrieval service provided by the document manager 60 includes sending a document and watermark information to a printer, such as the MFP, or use a print and delivery service. If the selected service is not document retrieval, then the MFP's operation may end. If the selected service is document retrieval, then at step 1140, the MFP prompts the user to input keywords. At step 1150, the MFP sends the document retrieval request, the keywords, the user I.D., the MFP's serial number to the document manager 60, which performs the document retrieval service. At step 1160, the MFP inquires whether retrieval results have been received. If no result has been received, the MFP loops until results are received. Once retrieval results are received, the MFP may go to step 1000 of FIG. 5F for the printing operation.

Figure 5H:
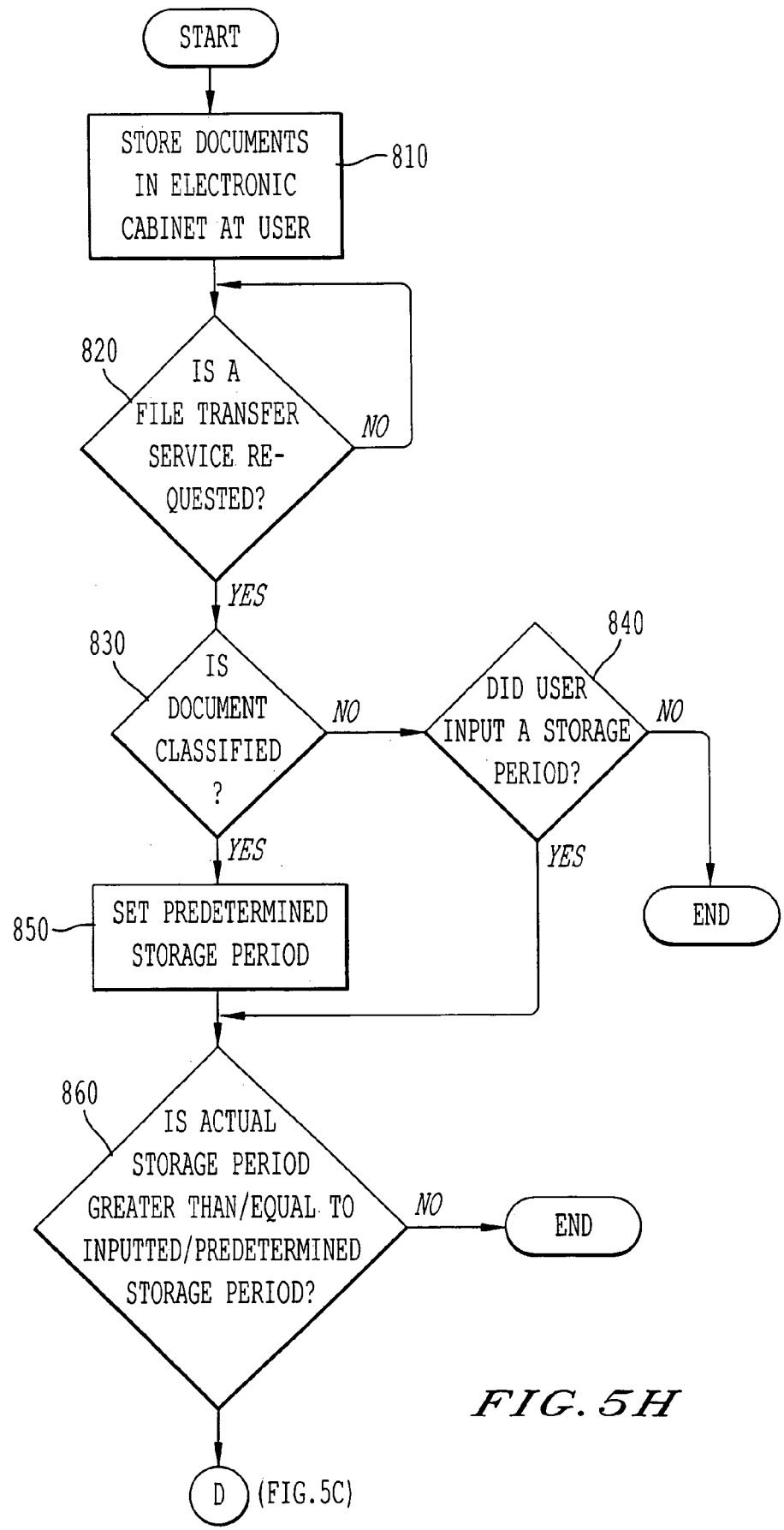

The document manager 60 of the present invention can also help the user manage documents stored at the user, for example in the user's local storage device 100. An example of a method of managing documents stored at the user according to the present invention is shown in FIG. 5H. At step 810, the document manager 60 stores documents in an electronic cabinet, i.e., a storage device such as the user's local storage device 100. The electronic cabinet is connected to the network 55 and stores documents from a variety of sources. For example, the electronic cabinet can store documents generated by the user's PC, scanned by the user's scanner, or retrieved by the document manager 60 from the ASPs, etc . . . The document manager 60 inquires at step 820 whether file transfer service is requested. The document manager 60 inquires at step 830 whether the document is classified or categorized in a predetermined category. Examples for predetermined categories are secured or non-secured documents, legal documents, insurance contracts, digital certificates, etc . . . In one embodiment, each category is associated with a predetermined storage period of time for storing the document at the user's storage device. This may be accomplished by a table stored on the document manager's storage device 64. If the document is categorized, the document manager 60 sets the predetermined storage period at step 850 based on the document's category. If the document is not classified, the document manager 60 inquires at step 840 whether the user inputted a storage period. If the document is not classified and the user did not specify a period of time for storage, the document manager 60 can end its routine. At step 860, the document manager 60 checks whether the actual period of storage of the document at the user's storage device is greater than (or equal to) the inputted or predetermined period of time for storage. If the actual storage period is greater than the inputted or predetermined storage period, the document manager 60 proceeds to step 380 shown in FIG. 5C for storing a document on the ASP. Otherwise, the document manager's routine can end. In the above, the inputted or predetermined storage period corresponds to a storage time period associated with the specific document to be transferred.

Figure 6A:
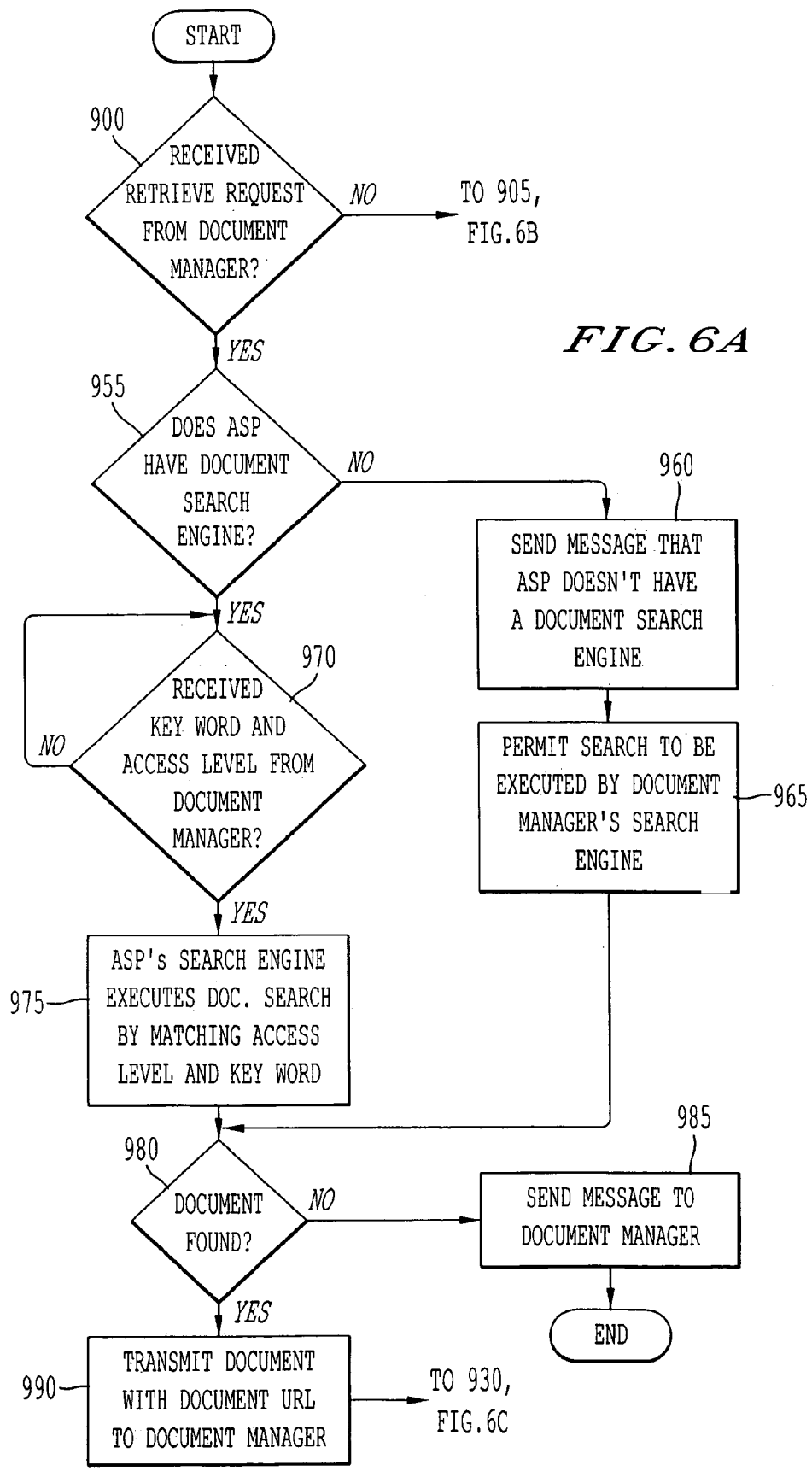
FIG. 6 shows a flowchart of a method of managing document implemented by an ASP according to one embodiment of the present invention.
Figure 6B:
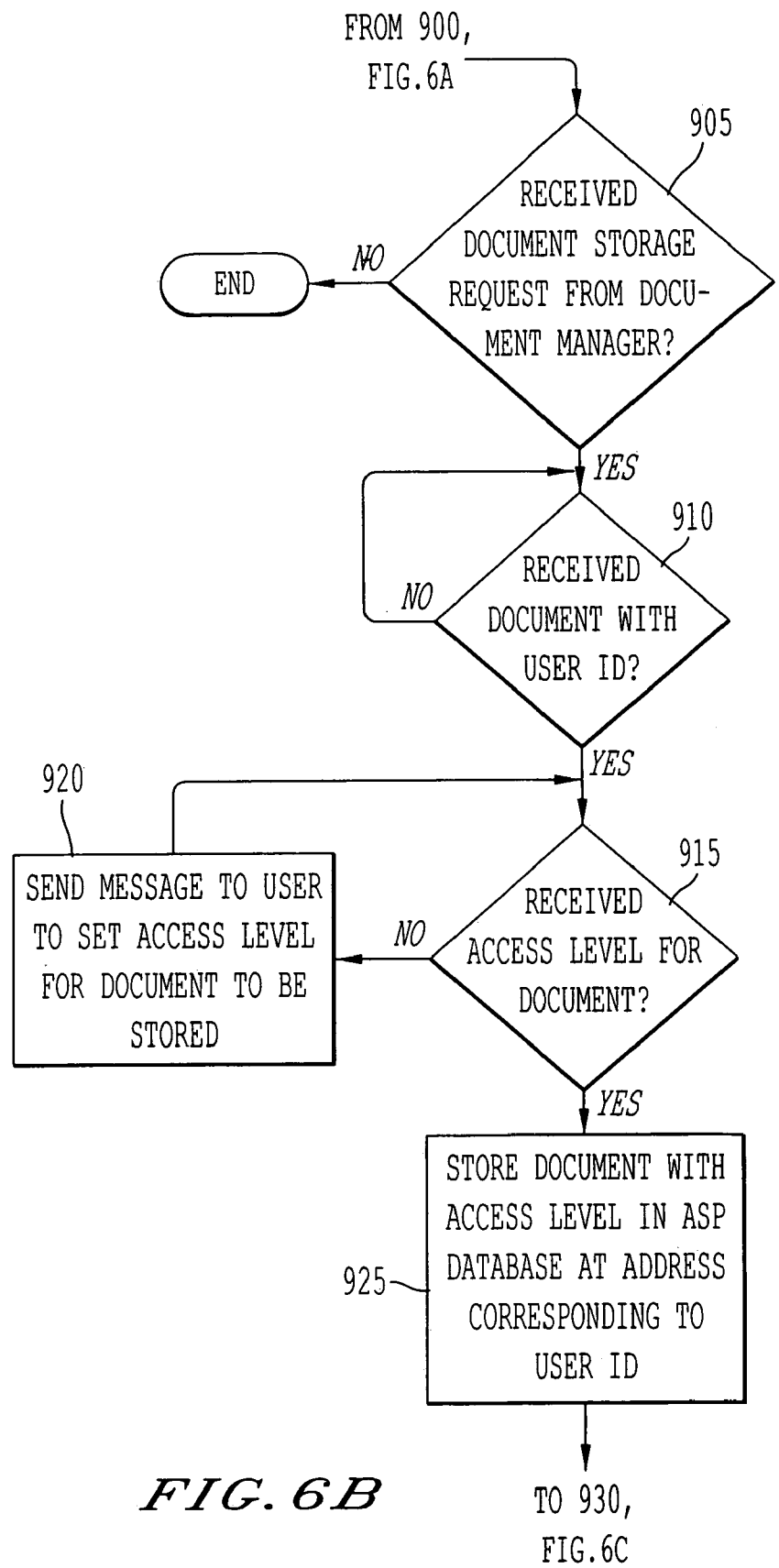
Figure 6C:
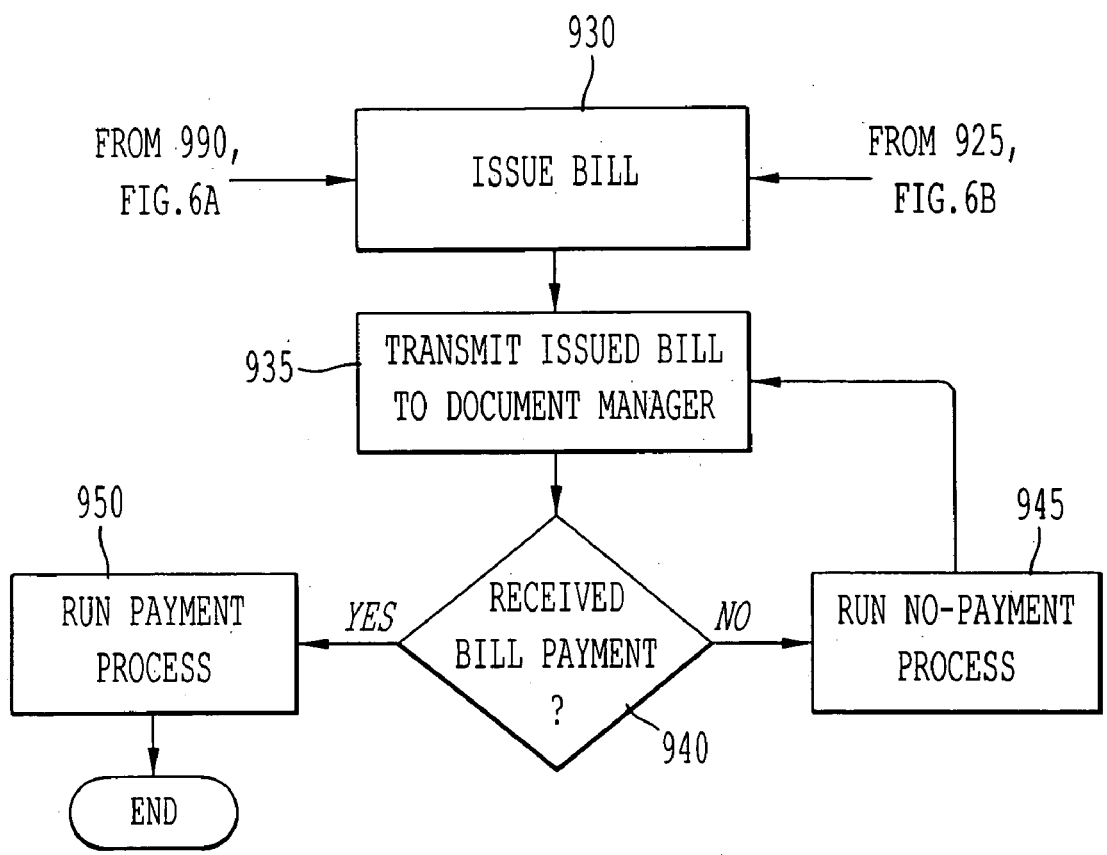

FIG. 6 shows a method of storing and retrieving documents implemented by an ASP according to the present invention. At step 900, the ASP inquires whether a retrieve request is received from the document manager 60. If not, the ASP inquires at step 905 whether a document storage request is received. If not, the ASP routine ends. If a document storage request is received, the ASP inquires at step 910 whether the document is received with the user's ID. If not, the ASP loops and returns to step 910. When the document is received, the ASP inquires at step 915 whether the access level for the document is received. If not, the ASP sends a message to the user at step 920 and requests the user to set the access level of the document to be stored. When the access level is received, the ASP stores the document at step 925. In a preferred embodiment, the ASP stores the document at an address corresponding to the user's ID. The ASP then issues a bill at step 930 and transmits the bill to the document manager 60 at step 935. The ASP inquires at step 940 whether the bill is paid. If not paid, the ASP runs a no-payment process at step 945, for example by sending the user and/or the document manager 60 a reminder. If the bill is paid, the ASP runs a payment process at step 950, for example by sending the user and/or the document manager 60 a receipt. The ASP's routine can then end.

Returning to step 900, if the received request is a document retrieve request, the ASP inquires at step 955 whether the ASP has a document search engine. If the ASP does not have a search engine, the ASP sends a message to the document manager at step 960, and permits the search to be executed by the document manager's search engine 62. If the ASP has a search engine, the ASP inquires at step 970 whether the key word(s) and access level of the user are received. If not, the ASP loops until the key word(s) and access level are received form the document manager 60. The ASP's search engine executes the search at step 975 based on the access level of the user and the key word(s). The ASP inquires at step 980 whether the document was found. If no document was found, the ASP sends a message at step 985 to the document manager to inform the document manager of the search results. Alternatively, the ASP can send a message directly to the user. If a document was found at step 980, the ASP transmits the document and the URL of the document to the document manager at step 990. The ASP then runs the billing routine of steps 930–950 as described above.

The above methods (FIGS. 4–6) represent exemplary embodiments of the present invention, and the present invention is not limited to the specific steps, nor the order of the steps, presented above. A person of ordinary skill in the art would recognize that the present invention can be implemented using a variety of similar steps in a variety of orders.

Figure 7:
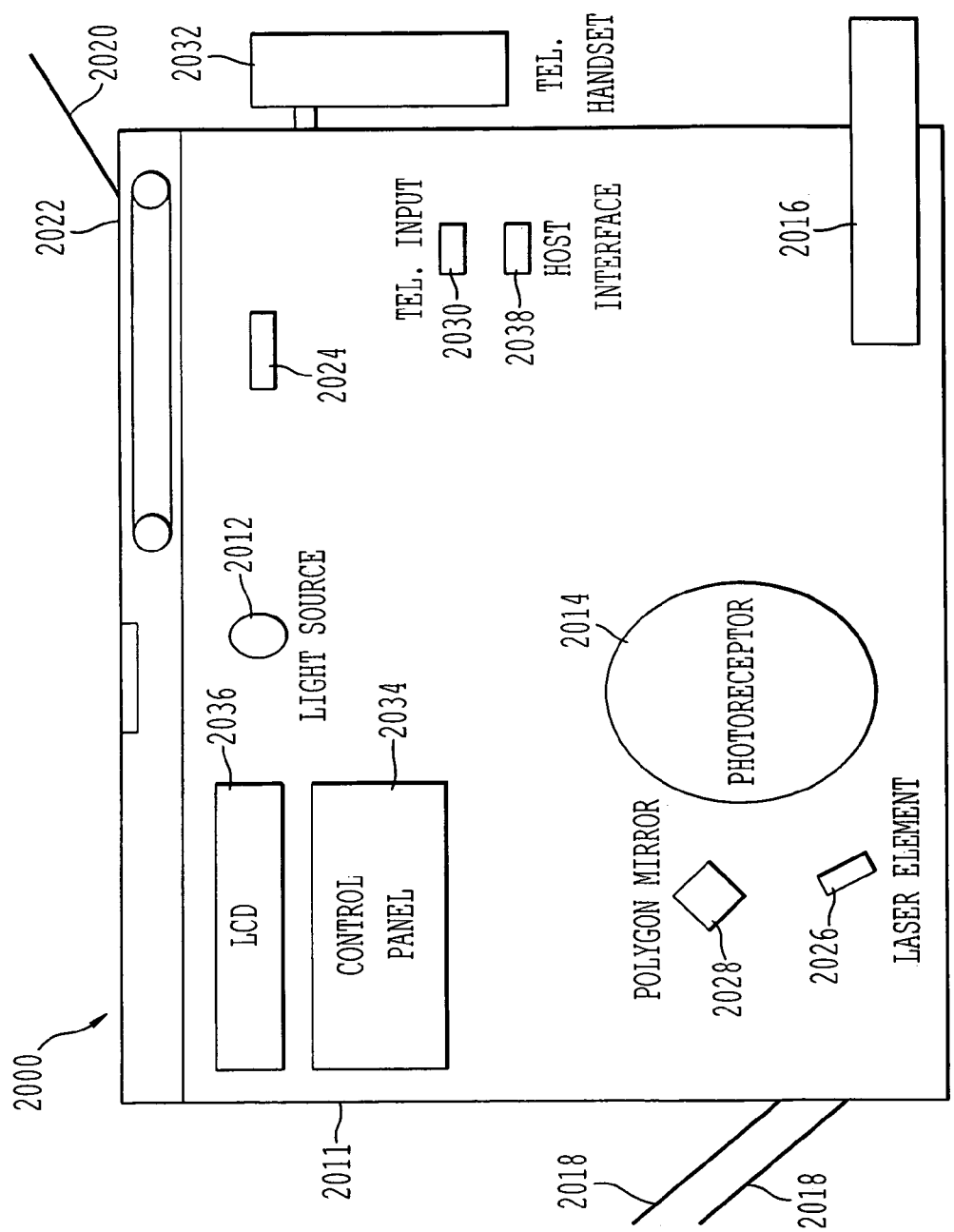
FIG. 7 is a schematic representation of a device capable of implementing the multi-function device according to the present invention.
Figure 8:
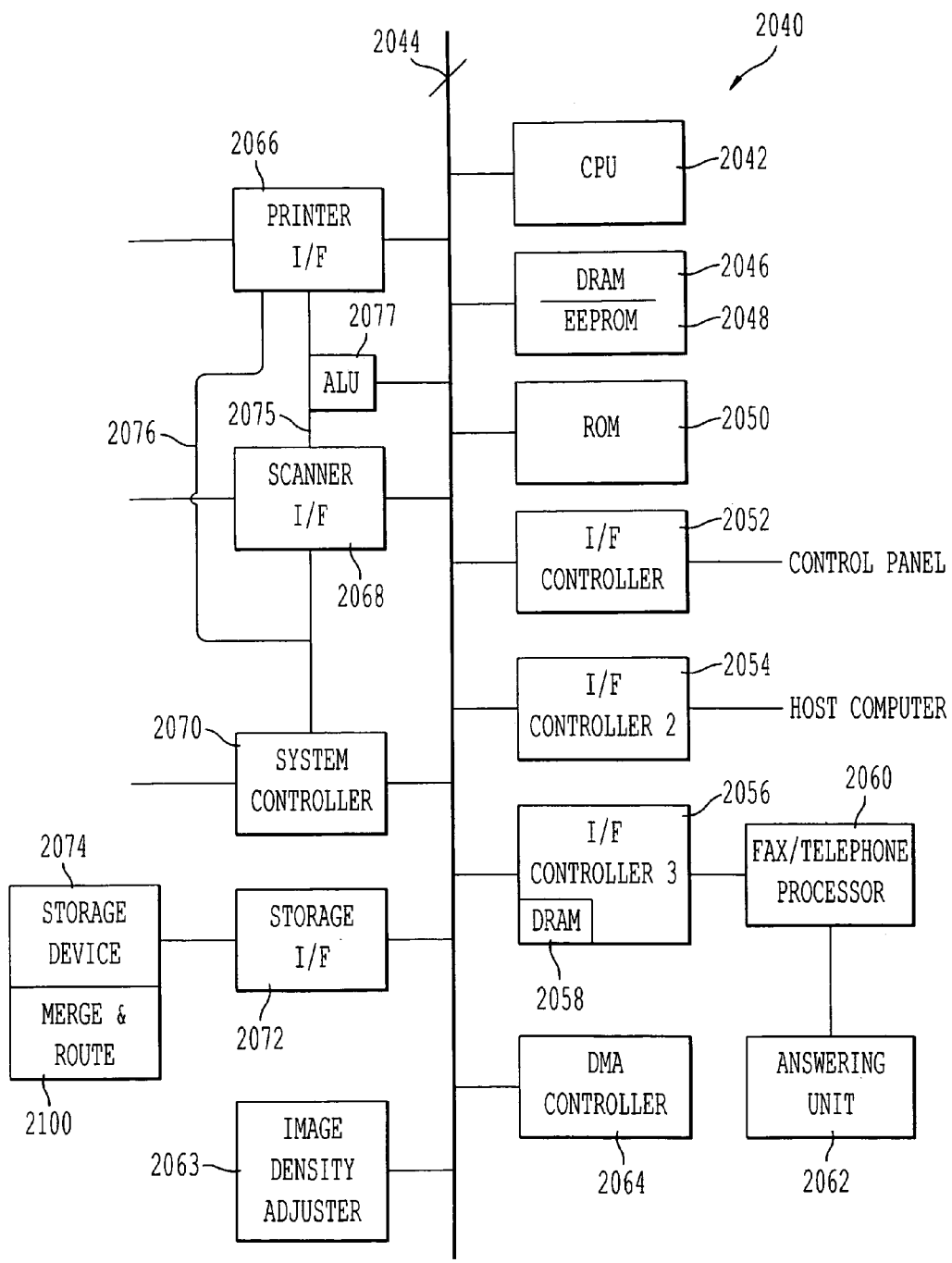
FIG. 8 is a block diagram illustrating a device capable of implementing the multi-function device according to the present invention.

In FIGS. 7 and 8, a multi-function machine 2000 is illustrated as an example of digital printer 85 for printing out documents in conjunction with document manager 60. The multi function machine 2000 is thus an example of a device that can implement the method shown in FIGS. 5F–G. The multi function machine 2000 is briefly described below but is described in more detail in U.S. Pat. No. 5,995,678, the entire content of which is hereby incorporated by reference.

Referring to FIG. 7, multi-function machine 2000 includes a housing 2011. Within the housing 2011 is a light source 2012 for scanning images. The housing 2011 also includes a photoreceptor 2014 for creating latent images for the printer, copier and facsimile functions of the machine. A paper tray 2016 and output bins 2018 are also provided for the output aspect of the machine 2010. A document feed 2020 and automatic document transport 2022 may also be provided.

The machine 2000 also includes a Charge Coupled Device (CCD) 2024 to realize scanning functions. In addition, the machine 2000 also includes a laser element 2026 and a polygon mirror 2028. The laser element 2026 and polygon mirror 2028 are used to write information on photoreceptor 2014 and thereby achieve a printing function, as is known in the art. This printing function may be used in accordance with telephone input 2030 to provide a facsimile capability to the machine 2010. A telephone handset 2032 is also provided.

The multi-function machine 2000 may thus include a copier, a scanner, a printer, and a facsimile apparatus. Selection of the individual functions may be achieved through a control panel 2034. Preferably, the machine 2000 also includes an LCD 2036 which provides status information. The machine 2000 also includes a host interface 2038 which may be coupled to a network. The document manager 60 which is connected to the machine 2000 through the network may be used to provide retrieved document data and watermark information such as the document's Name, file name, the originator of the document, the version of the document, the user ID, the retrieved or printed date and time, the MFP's serial number and the MFP's location to the machine 2000. The retrieved document data and the watermark information are merged and the merged data is printed on a sheet of paper, which may be output, for example at output bins 2018.

Turning to FIG. 8, a block diagram of the primary electronic components 2040 of the machine 2000 is provided. System bus 2044 connects all the modules of the system. CPU 2042 services multiple tasks while monitoring the state of the machine. DRAM 2046 and EEPROM 2048 are preferably provided. ROM module 2050 includes initial values, default values, and firmware. The firmware may include printing instructions to handle proper printer commands such as PCL5 from Hewlett-Package or PostScript from Adobe Systems. Interface controller 2052 is coupled to control panel 2034. Interface controller 2054 is preferably coupled to a network through host interface 2038.

Interface controller 2056 includes DRAM 2058 and is coupled to fax/telephone processor 2060. Preferably, the fax/telephone processor 2060 has a module which distinguishes the incoming information as either voice or fax data, and automatically switches the system to the appropriate mode by notifying the CPU 2042. The fax/telephone processor 2060 is coupled to telephone handset 2032 to handle voice information. Interface controller 2056 is preferably coupled to an answering unit 2062.

A direct memory access controller 2064 is also provided. Printer interface 2066 is coupled to the printing elements (laser 2026, polygon mirror 2026, and photoreceptor 2014 to create the desired output image, Scanner interface 2068 interfaces with the CCD 2024 so that scanned digital images can be obtained. System controller 2070 is connected with scanner interface 2068 and printer interface 2066 through bus 2044 and bus 2076, which allows the input-output related functions such as copying. For copying, bus 2075 provides an interface between the scanner and printer which enables the movement of image data.

Arithmetic Logic Unit (ALU) 2077 is used to merge data from the interface controller 2054 with data from EEPROM 2048. The data from the interface controller 2054 includes the retrieved document data and watermark information. The retrieved document data and the watermark information can be temporarily stored in DRAM 2046. Data temporally stored in the DRAM 2046 can be read out and sent to the ALU 2077 to be merged.

If the image density of the retrieved document is the same as that of the watermark information, it is difficult for user to read or interpret the watermark on the printed document. In order to avoid this drawback, a preferred embodiment of the present invention uses an image density adjuster 2063. The data from the DRAM 2046 is sent to the image density adjuster 2063. The image density adjuster 2063 detects the lowest image density of the retrieved document data. Then the image density adjuster 2063 sets or adjusts the image density of the watermark information lower than that of the lowest image density of the retrieved document data. Then the retrieved document data and the watermark information are transmitted to the ALU 2077. After merging the data at the ALU 2077, the merged data is transmitted to the printer interface 2066 for printing.

Storage interface 2072 is coupled to external storage units 2074, which may be for example hard disks, optical disks, and/or floppy disks. The storage device 2074 may store sets of instructions to be used in accordance with the invention. Alternatively, these instructions may be stored in ROM 2050.

Figure 9:
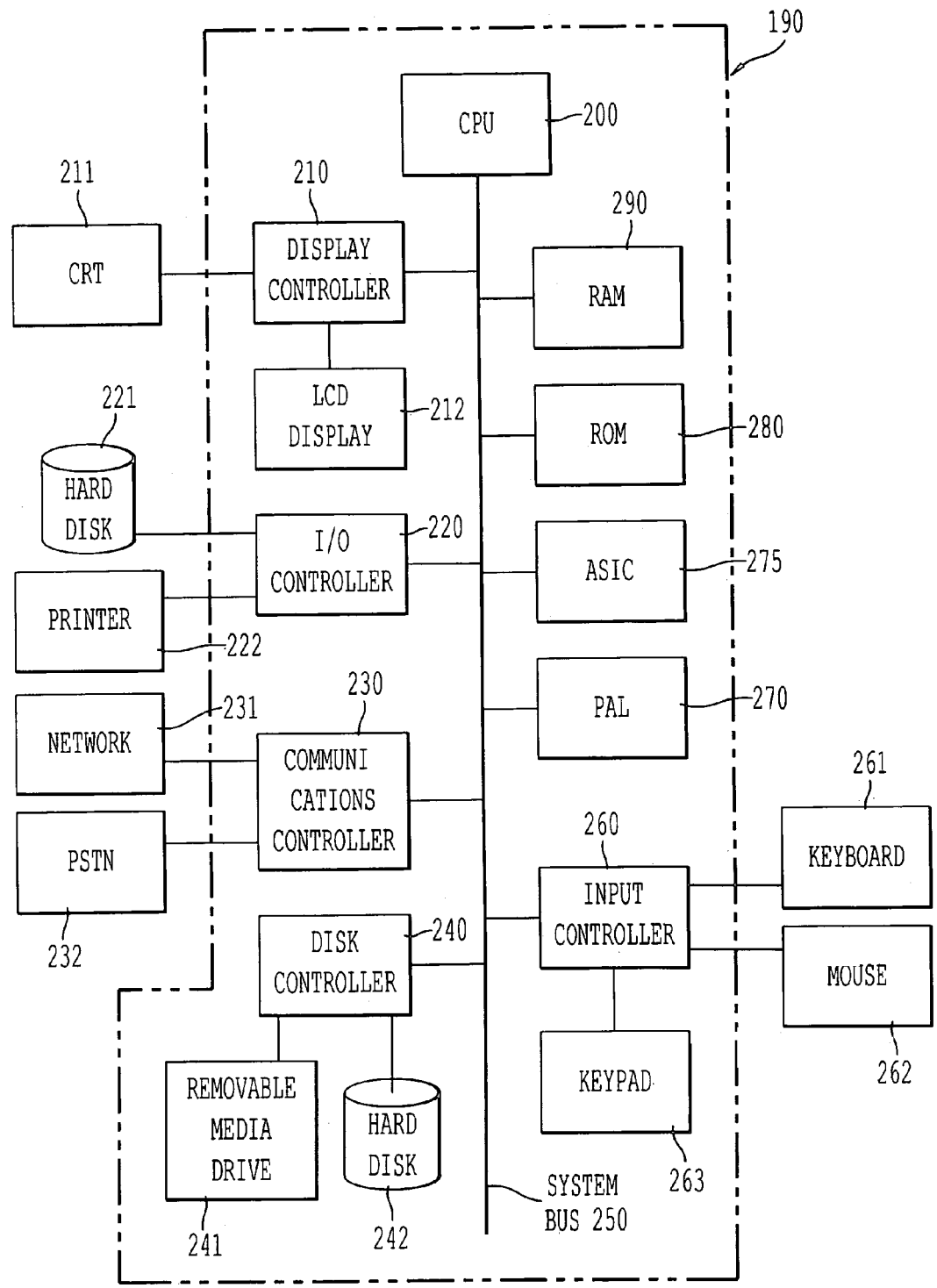
FIG. 9 is a block diagram illustrating a device capable of implementing the document manager according to the present invention.

If a printer 90 is used instead of the multi-function machine 85/2000, the software to execute the aforementioned operation is stored in the RAM 290 (FIG. 9). The machine serial number and the location are transmitted from the printer which is connected to the PC 80 (FIG. 2) and stored in the RAM 290. Based upon the instruction of the CPU 200 (FIG. 9), the PC 80 executes the aforementioned operation, namely adjusting the image density, merging the data and then transmits the merged data to the printer 90.

Figure 10:
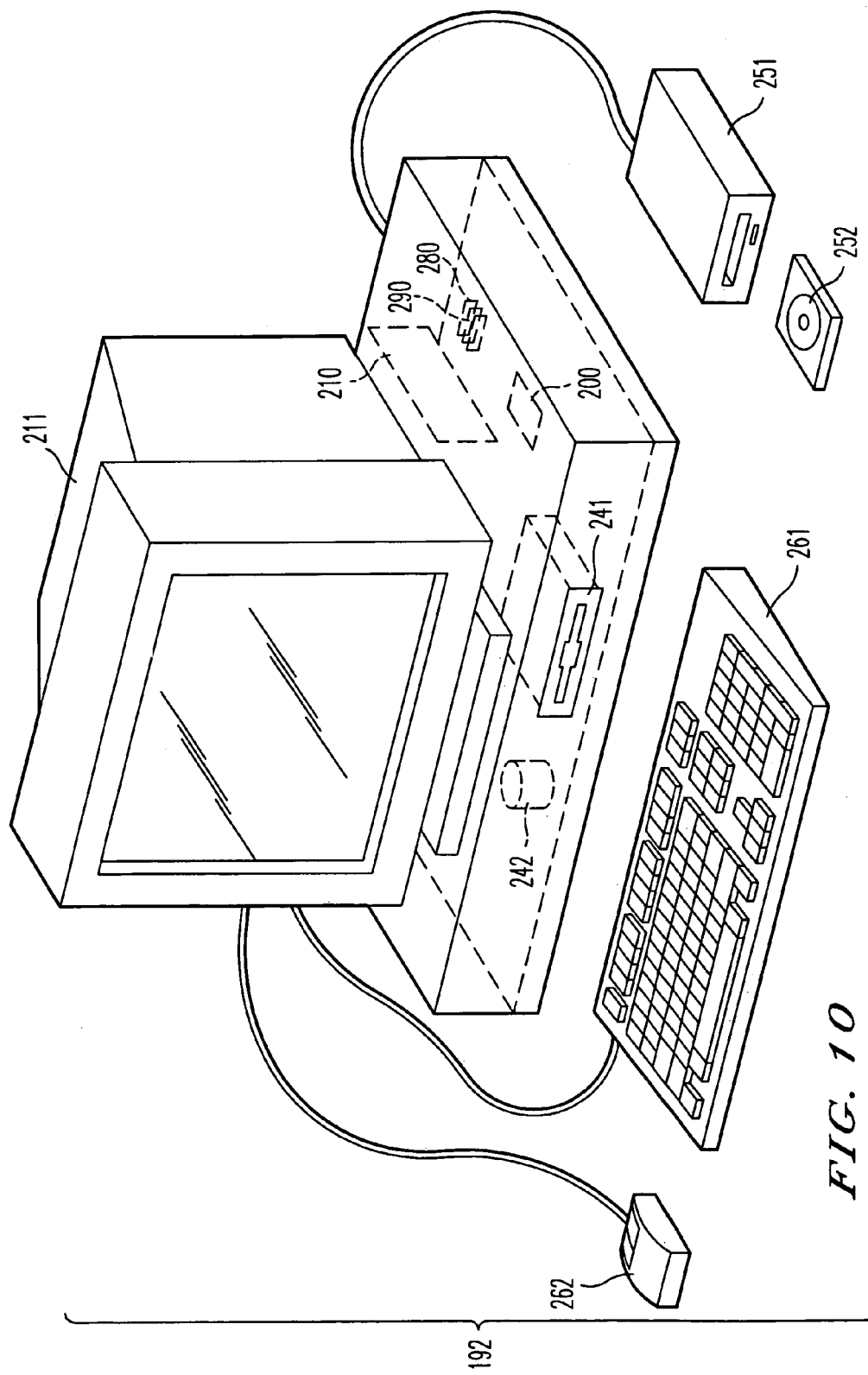
FIG. 10 is a schematic representation of a device capable of implementing the document manager according to the present invention.

FIG. 9 is a block diagram of a device 190 that can be used as the user 70, PC 80, and the document manager 60 shown in FIGS. 2 and 3 and can implement the methods shown in FIGS. 4–6. FIG. 10 is a schematic representation of device 190. The device 190 includes a central processing unit 200 (CPU) that communicates with a number of other devices by way of a system bus 250. The device 190 includes a random access memory (RAM) 290 that hosts temporary storage values used in implementing the document managing functions of the document managers, such as document texts, document graphics, document formats, ASPs' URLs, ASP billing information, etc.

A conventional personal computer or computer workstation with sufficient memory and processing capability may also be configured to operate as device 190. In one embodiment, device 190 operates as the document manager 60, both receiving and transmitting information by users and ASPs. Central processing unit 200 is configured for high volume data transmission and performing a significant number of mathematical calculations in processing communications and database searches. A Pentium in microprocessor such as the 1 GHz Pentium III manufactured by Intel Inc. may be used for CPU 100. This processor employs a 32 bit architecture. Other suitable processors include the Motorola 500 MHZ PowerPC G4 processor and the Advanced Micro Devices 1 GHz AMD Athlon processor. Multiple processors or workstations may be used as well.

The ROM 280 is preferably included in a semiconductor form although other read-only memory forms including optical media may be used to host application software and temporary results. The ROM 280 connects to the system bus 250 for use by the CPU 200. The ROM 280 includes computer readable instructions that, when executed by the CPU 200, perform the different functions discussed above associated with managing documents from ASPs. An input controller 260 connects to the system bus 250 and provides an interface with various peripheral equipment including a keyboard 261 and a pointing device such as a mouse 262. The input controller 260 may include different ports such as a mouse port in the form of a PS2 port or, for example, a universal serial bus (USB) port. The keyboard port for the input controller 260 is in the form of a mini-DIN port although other connectors may be used as well. The input controller 260 provides sound card connections so that external jacks on the sound card allow users to attach microphone speakers or an external sound source. The input controller 260 also may include serial ports or parallel ports as well.

A disk controller 240 is in the form of an IDE controller and connects via ribbon cables to a floppy disk drive 241 as well as a hard disk drive 242, a CD-ROM drive 251 and a compact disk 252 (FIG. 10). In addition, a PCI expansion slot is provided on the disk controller 240 or mother board that hosts the CPU 200. An enhanced graphic port expansion slot is provided and provides 3-D graphics with fast access to the main memory. The hard disk 242 may also include a CD-ROM that may be readable as well as writeable. A communication controller 230 provides a connection, perhaps by way of an Ethernet connection to a network 231. The network may be a connection to the public switch telephone network (PSTN) 232 for providing Internet access, or a local area network, wide area networks, a virtual private network (VPN), an extranet. In one embodiment, the network 231 and the connection to the communication controller 230 are made by way of a plurality of connections including a cable-modem connection, DSL connection, dial-up modem connection, and the like that connect to the communication controller 230.

An input/output controller 220 also provides connections to external components such as an external hard disk 221, printer 222 (90 in FIG. 2), for example, by way of an RS 232 port and a SCSI bus. For more information on how the input/output devices operate according to the present invention, such devices are described in part 5 of "How Computers Work", by Ron White, Que Corporation, pps. 184–276, September, 1999, ISBN: 0-7897-2112-0, the entire content of which is hereby incorporated by reference.

A display controller 210 interconnects the system bus 250 to a display device, such as a cathode ray tube (CRT) 211. While a CRT is shown, a variety of other display devices may be used such as an LCD (liquid crystal display), or plasma display device. As noted above, the components shown in FIGS. 9–10 can be included in both the user 70 and the document manager 60 shown in FIGS. 2–4.

The mechanisms and processes set forth in the present description may be implemented using a conventional general purpose microprocessor(s) programmed according to the teachings of the present specification, as will be appreciated to those skilled in the relevant arts. Appropriate software coding can readily be prepared by skilled programmers based on the teachings of the present disclosure, as will also be apparent to those skilled in the relevant arts.

The present invention thus also includes a computer-based product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

This invention may also be conveniently implemented using a conventional general purpose digital computer programmed according to the teachings of the present specification, as will be apparent to those skilled in the computer art. Appropriate software coding can readily be prepared by skilled programmers based on the teachings of the present disclosure as will be apparent to those skilled in the software art. In particular, the computer program product for managing ASP documents according to the present invention can be written in a number of computer languages including but not limited to C, C++, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims the present invention may be practiced otherwise than as specifically described herein.

What is claimed as new and desired to be secured by Letters Patent of the United States is:

1. A method for managing documents, comprising the steps of:

receiving, at a centralized document manager, a request for a document from a remote user;

selecting, using the document manager, an application service provider amongst a plurality of application service providers based on said request;

forwarding said request to said selected application service provider;

retrieving the document from said selected application service provider; and sending a merge command to a printing entity requesting that the document be printed with watermark information received from said printing entity.

2. The method of claim 1, further comprising the step of transmitting said watermark information to said printing entity.

3. The method of claim 1, further comprising the step of checking whether a watermark request is received, and wherein sending said merge command is based on said watermark request being received.

4. The method of claim 1, further comprising the step of checking whether said document is tagged, and wherein sending said merge command is based on said document being tagged.

5. The method of claim 1, further comprising the step of checking whether said document is digitally signed, and wherein sending said merge command is based on said document being digitally signed.

6. The method of claim 1, further comprising the steps of transmitting said document and said watermark information to said printing entity.

7. The method of claim 1, further comprising the step of retrieving additional watermark information from said selected application service provider.

8. The method of claim 1, further comprising the step of retrieving a document and at least part of said watermark information from said user.

9. The method of claim 8, further comprising the step of transmitting said document and at least a portion of said watermark information to an application service provider.

10. The method of claim 1, wherein the document manager performs said steps of forwarding said request, retrieving the document from said selected application service provider, and sending said merge command.

11. The method of claim 10, further comprising the step of transmitting at least a portion of said watermark information to said document manager.

12. The method of claim 10, further comprising the steps of:
scanning said document; and
transmitting said document to said document manager.

13. The method of claim 12, further comprising the step of transmitting at least a portion of said watermark information to said document manager.

14. The method of claim 10, further comprising the step of receiving said document from said document manager.

15. The method of claim 14, further comprising the step of receiving additional watermark information from said document manager.

16. The method of claim 15, further comprising the step of merging said document with said additional watermark information.

17. The method of claim 16, further comprising the step of printing said document with said watermark.

18. The method of claim 17, further comprising the step of adjusting an image density for said additional watermark information so that said image density for said additional watermark information is lower than an image density for said document.

19. A system for managing documents, comprising:
means for receiving a request for a document from a remote user;
means for selecting, using a centralized document manager, an application service provider amongst a plurality of application service providers based on said request;
means for forwarding said request to said selected application service provider;
means for retrieving the document from said selected application service provider; and
means for sending a merge command to a printing entity requesting that the document be printed with watermark information received from said printing entity.

20. The system of claim 19, further comprising means for transmitting said watermark information to said printing entity.

21. The system of claim 19, further comprising means for checking whether a watermark request is received, and wherein said means for sending send said merge command based on said watermark request being received.

22. The system of claim 19, further comprising means for checking whether said document is tagged, and wherein said means for sending send said merge command based on said document being tagged.

23. The system of claim 19, further comprising means for checking whether said document is digitally signed, and wherein said means for sending send said merge command based on said document being digitally signed.

24. The system of claim 19, further comprising means for transmitting said document and said watermark information to said printing entity.

25. The system of claim 19, further comprising means for retrieving additional watermark information from said selected application service provider.

26. The system of claim 19, further comprising means for retrieving a document and at least part of said watermark information from said user.

27. The system of claim 26, further comprising means for transmitting said document and at least a portion of said watermark information to an application service provider.

28. The system of claim 19, further comprising means for transmitting said request to said document manager including said means for receiving said request, said means for selecting said application service provider, said means for forwarding said request, said means for retrieving the document from said selected application service provider, and said means for sending said merge command.

29. The system of claim 28, further comprising means for transmitting at least a portion of said watermark information to said document manager.

30. The system of claim 28, further comprising:
means for scanning said document; and
means for transmitting said document to said document manager.

31. The system of claim 30, further comprising means for transmitting at least a portion of said watermark information to said document manager.

32. The system of claim 28, further comprising means for receiving said document from said document manager.

33. The system of claim 32, further comprising means for receiving additional watermark information from said document manager.

34. The system of claim 33, further comprising means for merging said document with said additional watermark information.

35. The system of claim 34, further comprising means for printing said document with said watermark.

36. The system of claim 35, further comprising means for adjusting an image density for said additional watermark information so that said image density for said additional watermark information is lower than an image density for said document.

37. A computer program product, comprising:
a computer storage medium and a computer program code mechanism embedded in the computer storage medium for causing a computer to manage documents over a computer network, the computer program code mechanism comprising:
a first computer code device configured to receive, at a centralized document manager, a request for a document from a remote user;
a second computer code device configured to select, using the document manager, an application service provider amongst a plurality of application service providers based on said request;
a third computer code device configured to forward said request to said selected application service provider;

a fourth computer code device configured to retrieve the document from said selected application service provider; and a fifth computer code device configured to send a merge command to a printing entity requesting that the document be printed with watermark information received from said printing entity.

38. The computer program product of claim 37, further comprising a sixth computer code device configured to transmit said watermark information to said printing entity.

39. The computer program product of claim 37, further comprising a sixth computer code device configured to check whether a watermark request is received, and wherein said fifth computer code device is configured to send said merge command based on said watermark request being received.

40. The computer program product of claim 37, further comprising a sixth computer code device configured to check whether said document is tagged, and wherein said fifth computer code device is configured to send said merge command based on said document being tagged.

41. The computer program product of claim 37, further comprising a sixth computer code device configured to check whether said document is digitally signed, and wherein said fifth computer code device is configured to send said merge command based on said document being digitally signed.

42. The computer program product of claim 37, further comprising a sixth computer code device configured to transmit said document and said watermark information to said printing entity.

43. The computer program product of claim 37, further comprising a sixth computer code device configured to retrieve additional watermark information from said selected application service provider.

44. The computer program product of claim 37, further comprising a sixth computer code device configured to retrieve a document and at least part of said watermark information from said user.

45. The computer program product of claim 37, further comprising a seventh computer code device configured to transmit said document and at least a portion of said watermark information to an application service provider.

46. The computer program product of claim 37, further comprising a sixth computer code device configured to transmit said request to the document manager configured to receive said request, to select said application service provider, to forward said request, to retrieve the document from said selected application service provider, and to send said merge command.

47. The computer program product of claim 46, further comprising a seventh computer code device configured to transmit at least a portion of said watermark information to said document manager.

48. The computer program product of claim 46, further comprising:
a seventh computer code device configured to scan said document; and
an eighth computer code device configured to transmit said document to said document manager.

49. The computer program product of claim 48, further comprising a ninth computer code device configured to transmit at least a portion of said watermark information to said document manager.

50. The computer program product of claim 46, further comprising a seventh computer code device configured to receive said document from said document manager.

51. The computer program product of claim 50, further comprising an eighth computer code device configured to receive additional watermark information from said document manager.

52. The computer program product of claim 51, further comprising a ninth computer code device configured to merge said document with said additional watermark information.

53. The computer program product of claim 52, further comprising a tenth computer code device configured to print said document with said watermark.

54. The computer program product of claim 53, further comprising an eleventh computer code device configured to adjust an image density for said additional watermark information so that said image density for said additional watermark information is lower than an image density for said document.

55. A method for managing documents, comprising the steps of:
receiving, at a centralized document manager, a request for a document from a remote user;
selecting, using the document manager, an application service provider amongst a plurality of application service providers based on said request;
retrieving said document;
merging said document with watermark information received from a printing entity; and
transmitting said document merged with said watermark information to said printing entity.

56. The method of claim 55, wherein retrieving said document is performed by retrieving said document from said remote user.

57. The method of claim 55, wherein retrieving said document is performed by retrieving said document from said selected application service provider.

58. The method of claim 55, further comprising the step of retrieving additional watermark information from said selected application service provider.

59. The method of claim 55, further comprising the step of retrieving additional watermark information from said remote user.

60. The method of claim 55, further comprising the step of checking whether said document is tagged, and wherein said merging step is performed if said document is tagged.

61. The method of claim 55, further comprising the step of checking whether said document is digitally signed, and wherein said merging step is performed if said document is digitally signed.

62. A system for managing documents, comprising:
means for receiving a request for a document from a remote user;
means for selecting, using a centralized document manager, an application service provider amongst a plurality of application service providers based on said request;
means for retrieving said document;
means for merging said document with watermark information received from a printing entity; and
means for transmitting said document merged with said watermark information to a said printing entity.

63. The system of claim 62, wherein said means for retrieving said document include means for retrieving said document from said remote user.

64. The system of claim 62, wherein said means for retrieving said document include means for retrieving said document from said selected application service provider.

65. The system of claim 62, further comprising means for retrieving additional watermark information from said selected application service provider.

66. The system of claim 62, further comprising means for retrieving additional watermark information from said remote user.

67. The system of claim 62, further comprising means for checking whether said document is tagged, and wherein said means for merging merge said document with said watermark information if said document is tagged.

68. The system of claim 62, further comprising means for checking whether said document is digitally signed, and wherein said means for merging merge said document with said watermark information if said document is digitally signed.

69. A computer program product, comprising:
   a computer storage medium and a computer program code mechanism embedded in the computer storage medium for causing a computer to manage documents over a computer network, the computer program code mechanism comprising:
   a first computer code device configured to receive, at a centralized document manager, a request for a document from a remote user;
   a second computer code device configured to select, using the document manager, an application service provider amongst a plurality of application service providers based on said request;
   a third computer code device configured to retrieve said document;
   a fourth computer code device configured to merge said document with watermark information received from a printing entity; and
   a fifth computer code device configured to transmit said document merged with said watermark information to said printing entity.

70. The computer program product of claim 69, wherein said third computer code device is configured to retrieve said document from said remote user.

71. The computer program product of claim 69, wherein said third computer code device is configured to retrieve said document from said selected application service provider.

72. The computer program product of claim 69, further comprising a sixth computer code device configured to retrieve additional watermark information from said selected application service provider.

73. The computer program product of claim 69, further comprising a sixth computer code device configured to retrieve additional watermark information from said remote user.

74. The computer program product of claim 69, further comprising a sixth computer code device configured to check whether said document is tagged, and wherein said fourth computer code device is configured to merge said document with said watermark information if said document is tagged.

75. The computer program product of claim 69, further comprising a sixth computer code device configured to check whether said document is digitally signed, and wherein said fourth computer code device is configured to merge said document with said watermark information if said document is digitally signed.

* * * * *